United States Patent [19]
Schlang

[11] 3,784,982
[45] Jan. 8, 1974

[54] ELECTRO-OPTICAL HANDWRITTEN CHARACTER READER

[75] Inventor: Arthur Schlang, Woodbury, N.Y.

[73] Assignee: Isotec Incorporated, Woodbury, N.Y.

[22] Filed: Aug. 16, 1971

[21] Appl. No.: 172,138

Related U.S. Application Data

[63] Continuation-in-part of Ser. No. 152,104, June 11, 1971.

[52] U.S. Cl. 340/146.3 J, 340/146.3 H, 340/146.3 Y
[51] Int. Cl. .............................................. G06k 9/12
[58] Field of Search .................................. 340/146.3

[56] References Cited

UNITED STATES PATENTS

| | | | |
|---|---|---|---|
| 3,178,688 | 4/1965 | Hill et al. | 340/146.3 AC |
| 3,136,976 | 6/1964 | Dietrich | 340/146.3 AC |
| 3,370,271 | 2/1968 | Van Dalen et al. | 340/146.3 H |
| 3,219,974 | 11/1965 | Rabinow | 340/146.3 SG |
| 3,189,873 | 6/1965 | Rabinow | 340/146.3 H |
| 3,482,210 | 12/1969 | Lozier, Jr. et al. | 340/146.3 D |

*Primary Examiner*—Paul J. Henon
*Assistant Examiner*—Leo H. Boudreau
*Attorney*—Edward H. Loveman

[57] ABSTRACT

An electro-optical character reader for handwritten characters includes a linear primary array of scanning cells and circuit means to generate pulses corresponding to the edges of characters scanned, to the number of strokes in the direction of movement of each character, and to the particular character and part thereof being scanned and means to generate stroke termination pulses corresponding to start and end of each character in the direction of character movement. A secondary array of scanning cells is effective in combination with appropriate circuit means to generate mid-character strobe pulses corresponding to character height, pulses corresponding to vertical stroke components of scanned characters, pulses corresponding to top and bottom points of scanned characters, points of inflection of severely distorted scanned characters.

8 Claims, 35 Drawing Figures

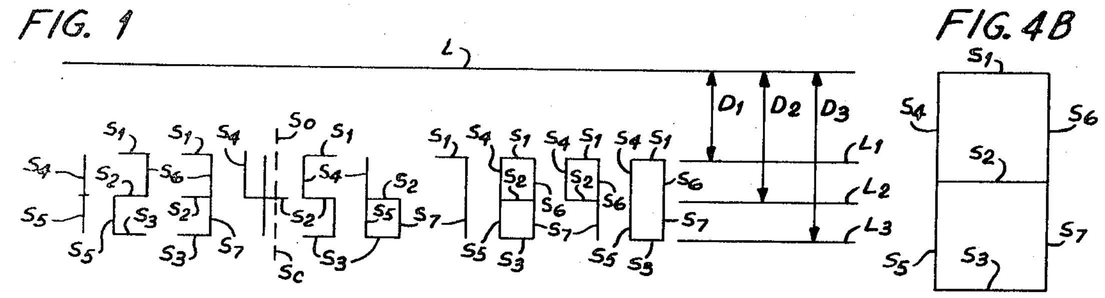
FIG. 1, FIG. 4B

FIG. 2

STROKE

| NUMERAL | $S_1$ | $S_2$ | $S_3$ | $S_4$ | $S_5$ | $S_6$ | $S_7$ |
|---|---|---|---|---|---|---|---|
| 1 | $\bar{X}$ | $\bar{X}$ | $\bar{X}$ | X | X | $\bar{X}$ | $\bar{X}$ |
| 2 | X | X | X | $\bar{X}$ | X | X | $\bar{X}$ |
| 3 | X | X | X | $\bar{X}$ | $\bar{X}$ | X | X |
| 4 | $\bar{X}$ | X | $\bar{X}$ | X | $\bar{X}$ | $\bar{X}$ | $\bar{X}$ |
| 5 | X | X | X | X | $\bar{X}$ | $\bar{X}$ | X |
| 6 | $\bar{X}$ | X | X | X | X | $\bar{X}$ | X |
| 7 | X | $\bar{X}$ | $\bar{X}$ | $\bar{X}$ | $\bar{X}$ | X | X |
| 8 | X | X | X | X | X | X | X |
| 9 | X | X | $\bar{X}$ | X | $\bar{X}$ | X | X |
| 0 | X | $\bar{X}$ | X | X | X | X | X |

FIG. 4A

| NUMERAL | $S_2$ | $S_4$ | $S_5$ | $S_6$ | $S_7$ |
|---|---|---|---|---|---|
| 1 | $\bar{X}$ | | | | $\bar{X}$ |
| 2 | | | | X | $\bar{X}$ |
| 3 | X | $\bar{X}$ | $\bar{X}$ | | |
| 4 | | | $\bar{X}$ | | $\bar{X}$ |
| 5 | | | $\bar{X}$ | $\bar{X}$ | X |
| 6 | | | X | $\bar{X}$ | X |
| 7 | $\bar{X}$ | $\bar{X}$ | | | |
| 8 | X | X | X | X | |
| 9 | | X | $\bar{X}$ | X | |
| 0 | $\bar{X}$ | X | | X | |

FIG. 3A

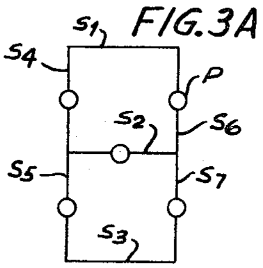

FIG. 3B

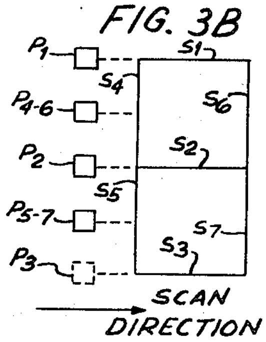

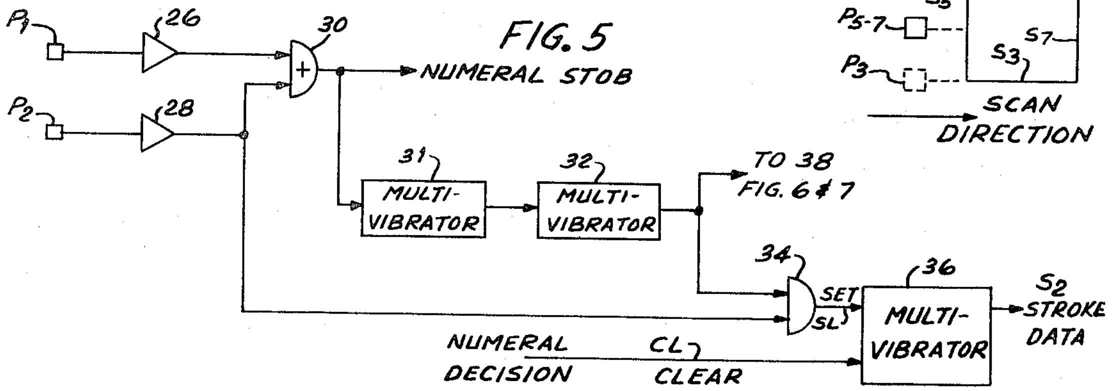
FIG. 5

| NUMERAL | $2^3$ | $2^2$ | $2^1$ | $2^0$ |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 0 | 0 | 0 | 0 |

FIG. 8A

INVENTOR.
ARTHUR SCHLANG
BY
Edward H. Loveman
ATTORNEY

INVENTOR.
ARTHUR SCHLANG
BY
Edward H. Loveman
ATTORNEY

INVENTOR.
ARTHUR SCHLANG

BY Edward H Loveman

ATTORNEY

INVENTOR.
ARTHUR SCHLANG

BY

Edward H. Loveman

ATTORNEY

INVENTOR.
ARTHUR SCHLANG

BY

Edward H. Loveman

ATTORNEY

INVENTOR.
ARTHUR SCHLANG

BY [signature]

ATTORNEY

INVENTOR.
ARTHUR SCHLANG
BY
Edward Loveman
ATTORNEY

INVENTOR.
ARTHUR SCHLANG
BY
Edward H. Loveman
ATTORNEY

ELECTRO-OPTICAL HANDWRITTEN CHARACTER READER

This application is a continuation-in-part of my co-pending application entitled "ELECTRO-OPTICAL CHARACTER READER," Ser. No. 152,104 filed June 11, 1971.

This invention relates to optical character reading machines, and more particularly concerns an electro-optical character reader which ascertains the identify of handwritten characters varying to a greater or lesser extent from a prescribed font, by optically scanning each character and ascertaining its two dimensional temporal characteristics.

In my prior patent application referred to above, there is disclosed an electro-optical character reader for a font of two dimensional plane characters based on an ideal plane matrix of two mutually perpendicular sets of linear strokes. The character reader comprises a linear array of scanning sensor elements disposed to scan one character at a time while the characters move in a direction perpendicular to the array of sensors. A logic circuit converts data pulses corresponding to detected strokes to data bits corresponding to characters scanned. The circuit includes means for detecting beginning and end edges of characters in their path of movement and is adapted to scan alphabetic and numeric characters inscribed in ideal form.

When alphabetic and numeric characters of a prescribed font are handwritten, variations in the characters occur which require refinements in the circuitry beyond those disclosed in my prior application, in order to effect accurate identification of the characters.

According to the present invention a character reading system is employed whereby irregularities in character stroke formation are standardized by a spatial sampling technique which rectifies irregularly formed handwritten character into a pseudo-block character capable of being read by a block character algorithm. A character sensor is employed including a multiplicity of photocells arranged in a long linear primary array in one direction to scan characters moved in a second direction transverse to the direction of disposition of the linear array of photocells. In this system, a mid-character strobe pulse is generated electrically in the center of the character to aid in accuracy of interpretation. The mid-character strobe pulse is generated by means of a secondary linear array of scanning photocells identical in cell number and direction of orientation to the primary array. Certain photocells in thc primary array served as sampling means as determined by analysis of the characters as scanned by the secondary array.

In another embodiment of my system, the mid-character strobe pulse is placed in an optimum position rather than the geometric center of the character. This is derived through vertical sampling of the character by the second array of photocells, prior to the scanning of the character by the primary array. Both vertical and horizontal pulse counts are used in extracting information concerning the forms of the characters scanned.

In still another embodiment of my system, the handwritten character reader employs a technique analogous to that employed in human character recognition by eye. Here the system looks for character commonalty traits that have a separate algorithm for each variation of a given character. In this manner, each character is reduced to just a few algorithms or even one. The character is standarized as to scale factor and distortions prior to being read. To accomplish this, each handwritten character is initially scanned for its gross characteristics. The results of these gross tests then dictate the nature of the subsequent fine examination.

It is therefore a principal object of the present invention to provide an optical reader of handwritten characters subject to variation from a prescribed norm.

A further object of the present invention is to provide an optical reader of handwritten characters employing spatial sampling techniques for rectifying irregularly formed handwritten characters into a pseudo-block character.

Another object of the present invention is to provide an optical reader of handwritten characters employing a secondary array of photocells to locate the center of a character, and a primary array of photocells succeeding the secondary array to scan prescribed elements of the character.

Stil another object of the present invention is to provide an optical reader of handwritten characters of the type described wherein a mid-character strobe pulse is generated in an optimum position within the character by sampling of the character by the secondary array of photocells.

A still further object of the present invention is to provide an optical reader of handwritten characters, wherein the characters are scanned and character commalty traits that have a separate algorithm for each given variation of a character are determined.

Yet another object of the present invention is to provide an optical reader of handwritten characters, as described, wherein each written character is initially examined for its gross characteristics and then a fine examination is performed determined in nature by the results of the gross examination.

These and other objects and many of the attendant advantages of this invention will be readily appreciated as the same becomes better understood by reference to the following detailed description when considered in connection with the accompanying drawings in which:

FIG. 1 is a diagram of a font of numerals having ideal configuration;

FIG. 2 is a table listing the constituent strokes of each of the numerals of FIG. 1;

FIG. 3A is a diagram of a two dimensional array of photocells for stroke detection;

FIG. 3B is a diagram of a one dimensional array of photocells for stroke detection;

FIG. 4A is a simplified table of constituent strokes of numerals;

FIG. 4B is a diagram of a numeral of ideal configuration with stroke designations thereon;

FIG. 5 is a diagram of a circuit employed to derive numeral stroke information from a scanning sensor;

FIG. 8A is a table indicating the binary state of output lines of the binary converter of FIG. 8;

Figure 6:
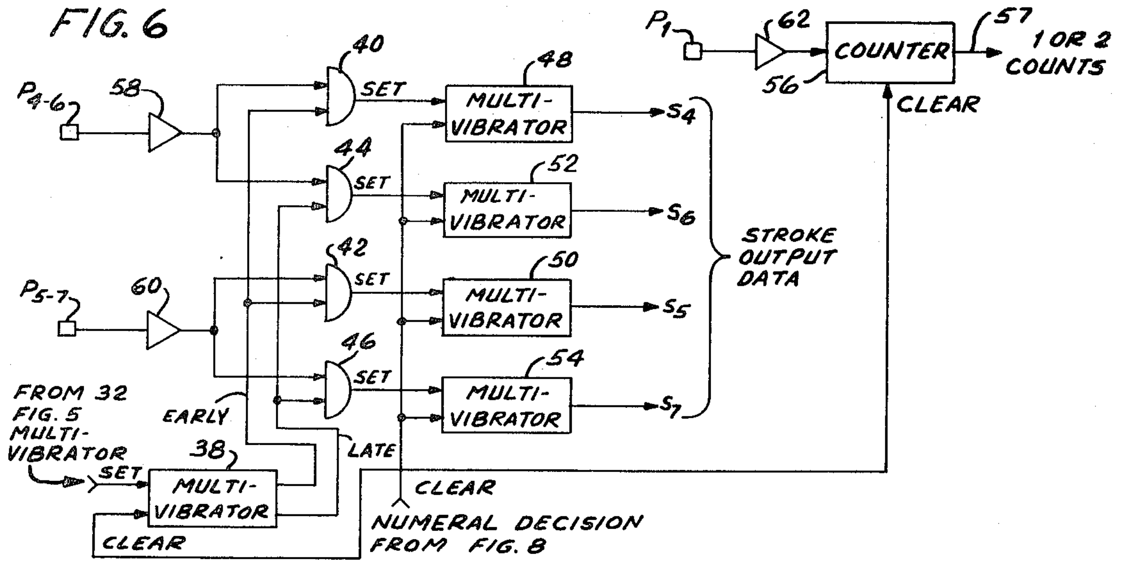
FIG. 6 is a diagram of a circuit employed for vertical stroke discrimination, and used in conjunction with the circuit of FIG. 5.

Referring now to the drawings wherein like reference characters designate like or corresponding parts throughout, there is illustrated in FIG. 1 numerals 1 through 9 and 0 of a prescribed font of rectangular numerals. All numerals except numeral 4 are composed of combinations of two or more strokes $S_1$ through $S_7$. Only numeral 8 utilizes all available strokes $S_1$ through $S_7$. There are three horizontal strokes $S_1$, $S_2$ and $S_3$, each of whose length is equal to the full numeral width and which are invariant from numeral to numeral. Numeral 4 is an exception and utilizes one additional long stroke $S_0$ which precedes a vertical center line $S_c$ and is not co-linear with the strokes $S_4$, $S_5$, $S_6$ or $S_7$. The stroke $S_1$ is co-linear with a line $L_1$, which is parallel to and at a distance $D_1$ from a reference line L which may be the top edge of a form being read. Similarly, stroke $S_2$ lies on a line L2, which line bisects all numerals vertically. the line $L_2$ is parallel to the reference line L and is at a distance $D_2$ from the reference line or top edge L of the form being read. Stroke $S_3$ lines on a Line $L_3$ which is also parallel to the reference line or edge L at the distance $D_3$. The lines $L_1$ and $L_3$ are a consequence equidistant from the line $L_2$ which mandates that the vertical strokes $S_4$, $S_5$, $S_6$ and $S_7$ be equal to each other in length and constant in length from numeral to numeral. The strokes $S_4$ and $S_5$ are co-linear with one another as are the strokes $S_6$ and $S_7$. All angles are right angles and fillets and rounded corner are avoided. However, a less than ideal font of rectangular numerals can also be accommodated by the system, for example, the 7B font, as jointly established by the Farrington and Addressograph groups, is readily accepted by this simplified version of the electro-optical character reader.

FIG. 2 summarizes in tabular form the constituent strokes of each numeral. The letter "$x$" signifies the presence of a stroke while "$\bar{x}$" (read as $x$ not) denotes stroke absence, which stroke absence or presence is ascertained by electro-optical techniques. Analysis of FIG. 2 indicates that knowledge of the strokes $S_1$ and $S_3$ provides redundant data in that numeral identify can be made on the basis of knowledge concerning the strokes $S_2$, $S_4$, $S_5$, $S_6$ and $S_7$ to the exclusion of the strokes $S_1$ and $S_3$. Each horizontal row in FIG. 2, denoting a different numeral, then contains a singular pattern of $x$ and $\bar{x}$ which unambiguously distinguishes its corresponding numeral from all other numerals. The first apparent solution for the stroke detection processes, is the utilization of a pattern of five photocells. P is a two-dimensional array as shown in FIG. 3A, wherein the photocells are superimposed over the numer 8 in an idealized portrayal. This approach has certain disadvantages which are occasioned by the necessity to match up two dual dimensional figures; as for example, when photocells reside directly over the strokes $S_2$, $S_4$ and $S_5$, dimensional errors of such strokes may cause either or both photocells intended to detect the strokes $S_6$ and $S_7$ to miss their respective targets. Similar errors can also be induced by rotational errors of such strokes where, for example, cells on the strokes $S_2$, $S_5$ and $S_6$ are active while the strokes $S_4$ and $S_7$ are bypassed. Thirdly, displacement errors of such strokes in either the vertical and/or the horizontal directions cause the photocells to miss relevant data. If one attempts to duplicant FIG. 3A in an effort to match the numerals on a one-to-one basis in a line of data, one must contend with inter-numeral spacing aberrations in addition to the previously mentioned errors. As will be explained, using only the three vertical aligned photocells P4–6, P2 and P5–7 of FIG. 3B, in lieu of the five photocells P of FIG. 3A, renders the optical character reader significantly less prone to the previously mentioned errors. For the moment, ignore photocells Pa and P3; however, where the pattern of five photocells could ascertain numeral identity with the simultaneous reading of all strokes, FIG. 3B illustrates a one dimensional arrangement of photocells which requires the numeral and array to be physically scanned past one another to gather stroke data on a time sequential basis. Thus FIG. 3A represents a purely spatial or geometric scheme while FIG. 3B depicts photocell temporal observation. In FIG. 3B a single photocell P4–6 asynchronously detects the absence or presence of strokes $S_4$ and $S_6$ while a single cell P5–7 detects the strokes $S_5$ and $S_7$, at different points in time. As the vertical character strokes impinge upon their respective photocells, each such photocell generates a short electrical impulse. Conversely horizontal stroke $S_2$ induces a long electrical impulse in its photocell by virtue of its greater physical length. The first pulse from photocell P4–6 or from P5–7 in FIG. 3B discloses the presence of vertical stroke $S_4$ or 5 respectively while the second pulse indicates the presence of vertical stroke $S_6$ or $S_7$ respectively. What is now required is a strobing signal whereby decision making circuits may determine whether the single pulse from the photocell P4–6 or the cell P5–7 is derived from the vertical stroke $S_4$ (or $S_5$) or from the vertical stroke $S_6$ (or $S_7$). Ideally, the strobing signal should be initiated when the leading edge of the numeral enters the photocell array, and terminate when the last element of that numeral leaves the photocell array. The numerals of FIG. 1 lend themselves to what is here termed, "self strobing characteristics", i.e..; there is contained within each of said numerals at least one unbroken horizontal stroke extending through the entire width of said numeral and which stroke is not exceeded in width by any other numeral element. A fourth photocell P1 is required for FIG. 3B which detects horizontal stroke $S_1$, and serves only for strobing and not for numeral identification. A fifth photocell indicated by dotted lines is not required for detecting stroke $S_3$ as previously explained. Electrically adding the outputs of photocells P1 and P2 provides the required numeral strobe for all numerals with horizontal stroke S2 now serving the dual function of providing both identification data and stroking information. The numeral strobe serves a second function in that identification of a numeral is thereby made only after the numeral has first been fully scanned. Such a technique insures that all available data about a numeral has been collected prior to any determination process being initiated. This is in contra-distinction to the manner in which the human eye-brain combination performs, that is, by pattern recognition.

With regard to the table of FIG. 2 it may be simplified as shown in FIG. 4A with FIG. 4B included for reference. It was previously demonstrated that horizontal strokes $S_1$ and $S_3$ could be eliminated and now the rationale for further simplication is given. Examining numeral 1, it is apparent that if there is an $\overline{X}$ in both stroke positions, $S_2$ and $S_7$, then no other stroke information about this numeral is required inasmuch as no other numeral contains this distinctive combination. Also, observe that a numeral determination can be made on the basis of what stroke is absent as well as on the basis of what stroke is present. The X, $\overline{X}$ pattern in stroke columns $S_6$ and $S_7$ is singular for numeral 2 as seen by referring back to FIG. 2. For positive identification, some numerals require knowledge of three strokes while numeral 8 requires data on four strokes. The long vertical stroke on numeral 4 in FIG. 1 is so placed as to form a symbol familiar to the eye but it is not required for numeral identification. The previous examples of simplification were arrived at by inspection and the remaining numerals can also be so simplified.

It will now be explained how the photocell outputs are processed to derive stroke information. Later this data is processed to form numeral identification information on nine wires. Lastly such numeral identification data for final processing by a digital computer is converted to standard machine language as ASCII and EBCDIC, i.e.,; an electrical signal format that a computer or its peripheral equipment is capable of receiving and interpreting. In FIG. 5, the presence of data is detected by cells P1 and P2 and each data bit is subsequently amplified prior to processing in a pair of amplifiers 26 and 28. These outputs are added in adder 30 to form a numeral strobe which frames the full numeral width. The output of adder 30 also activates a monostable multivibrator 32 to turn on simultaneously with the leading edge of the numeral strobe. The monostable multivibrator 30 automatically turns off timewise approximately in the midddle of a numeral. Thus if a numeral is scanned by the photocell array in 30 milliseconds, the monostable multivibrator 31 turns itself off after approximately 15 milliseconds. This timing is non-critical and may vary significantly about the midpoint, provided, however, that it occurs after the center of the vertical stroke of the numeral 4. When the monostable multivibrator 31 turns off, it triggers a monostable multivibrator 32 which generates a very narrow pulse whose duration in time is less than the time of passage of one vertical stroke width. This narrow pulse energizes AND gate 34 whose second input is the amplified output of the photocell P2. The AND gate 34 generates an output only if both its inputs are simultaneously energized. If a single vertical stroke is detected by the cells P1 and P2 AND gate 34 then receives a narrow pulse from the monostable multivibrator 32 about the center line of the numeral, but since the vertical stroke has long since terminated the gate 34 remains unresponsive. Conversely, if P2 detects a wide horizontal stroke then the monostable multivibrator 32 will fire such that AND gate 34 generates an output which sets a bi-stable multivibrator 36 to its logical 1 state to denote the presence of the stroke $S_2$.

Typically, the bi-stable multivibrator 36 exhibits two electrical states where normally its output is at logical "zero." When AND gate 34 produces a signal on the "set" line SL, the bi-stable multivibrator 36 changes state to a logical 1 indicating that a wide horizontal stroke ($S^2$) has been detected since as described above the narrow vertical strokes never propagate through AND gate 34 to set the bi-stable multivibrator 36. The essential purpose of the bi-stable multivibrator 36 is to provide the memory for the horizontal stroke $S_2$ necessary for all requisite numeral components before making any decision of numeral identity. The bi-stable multivibrator 36 is cleared, that is, its output is returned to zero level by means of the clear line CL after a numeral decision has been made and the circuit is ready to read the next following numeral.

The output of the monostable multivibrator 32 is also used for edge detection as shown by the diagram of the Vertical Stroke Discriminator in FIG. 6. The bi-stable multivibrator 38 initially, in FIG. 6, is in its clear state (the early output is binary 1, and the late output is binary 0) as instituted by the numeral decision (derived from the logic circuit of FIG. 8) of the previous numeral or some initiating control when the optical character reader is first turned on. A pair of AND gates 40 and 42 are then receptive to data while a second pair of AND gates 44 and 46 are inactivated. Data from photocells P4–6 and P5–7 if present are amplified via respective amplifiers 58 and 60 and are propagated through AND gates 40 and 42 and sets the proper bi-stable multivibrators 48 and/or 50 to indicate if the strokes $S_6$ and/or $S_7$ are present. Numeral 5 for example sets the bi-stable multivibrator 48 but has no effect on the bi-stable multivibrator 50. Conversely numeral 2 leaves the bi-stable multivibrator 48 untriggered but sets the bi-stable multivibrator 50. Numeral 3 sets neither bi-stable multivibrator 48 nor the bi-stable multivibrator 50.

Figure 7:
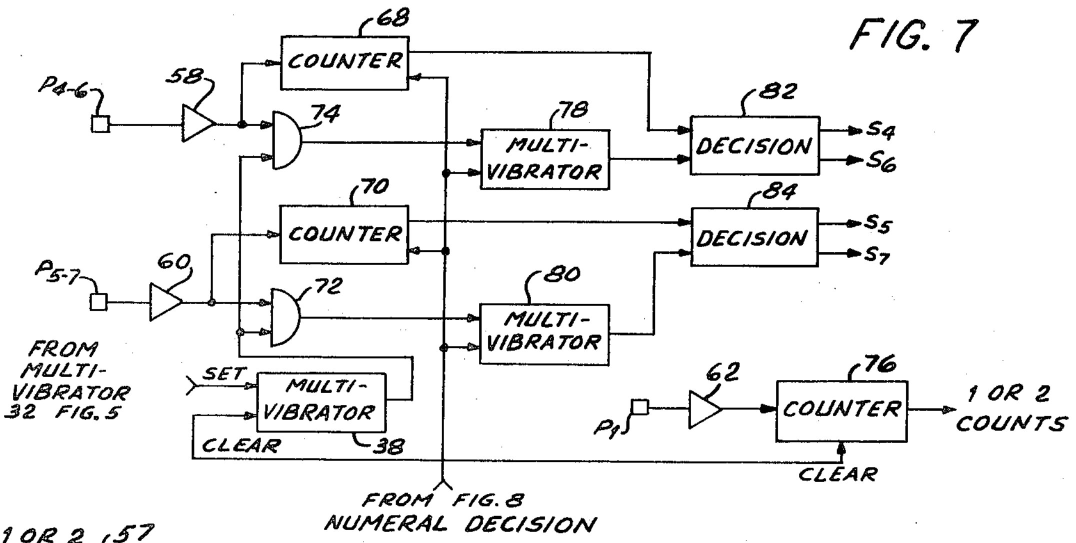
FIG. 7 is a diagram for vertical stroke discrimination involving a modification of the circuit of FIG. 6.

At approximately the center-line of each numeral the monostable multivibrator 32 of FIG. 5 generates a pulse which sets the bi-stable multivibrator 38 of FIG. 6. The AND gates 40 and 42 are inactivated and are no longer required because the leading edge vertical strokes have passed. The AND gates 44 and 46 then become receptive to data. A bi-stable multivibrator 52 remains unchanged for the numeral 5 but a bi-stable multivibrator 54 sets and conversely the bi-stable multivibrator 52 sets for the numeral 2 but the bi-stable multivibrator 54 remains fixed. Both of the bi-stable multivibrators 52 and 54 set for the numeral 3. As for the bi-stable multivibrator 36 of FIG. 5, the bi-stable multivibrators 48, 52, 50 and 54 in FIG. 6 are required for memory to insure that electrical data of a numeral's elements are retained for identity determination after the numeral has departed from exposure to scanning. All bi-stable multivibrators are returned to their quiescent states (cleared) after a numeral decision has been made. With this method, if the long vertical stroke of numeral 4 occurs after the middle of the numeral, this stroke would be interpreted as strokes $S_6$ and $S_7$ rather than be ignored. The numeral 4 would read as 9 would still be correctly read. The consequent criticalness in timing is eliminated as follows: The photocell output of P1 (FIG. 6) which in all other instances only provides strobing information, is amplified by an amplifier 62 and also drives a counter 56 which accumulates the number of impulses contained in any individual numeral on stroke level $S_1$. All numerals except 4 contain one count while numeral 4 contains two. A wide stroke, as on numeral 7 applies as a single count because it has no brakes, but numeral 4 has a single break. Thus the logic for numeral 4 in FIG. 4 is elminated and the output of the counter 56 is examined at decision making time for the presence of numeral 4. If a count of two is contained within the counter, it also deactivates the 9 decision block of FIG. 8 since that block with faulty timing could erroneously decode the numeral 4 as a 9. This counting technique can be carried further and FIG. 6 can be modified into FIG. 7. The photocells P4–6 and P5–7 are intended to detect left edges only and the numer of impulses for each photocell per numeral are also counted in respective counters 68 and 70. If two counts per photocell are detected, then both left and right edges are signified as being present. If one count is detected as in counter 70 and its associated left edge detector AND gate 72 generates an output, then the edge is left edge $S_5$. Conversely, if counter 70 generates one count and AND gate 72 has no output, then the edge signified thereby is right edge $S_7$. Note that for a dual count, the left edge detector 72 is activated but is output is ignored. A similar strategy applies to stroke $S_4$ and $S_6$ which utilize a counter 68 and the AND gate 74. A counter 76 is again employed to aid in the detection of numeral 4 in the same manner as described with reference to FIG. 6. The outputs of counter 68 and a bi-stable multivibrator 78 drive a decision block 82 which generates stroke data $S_4$ and/or $S_6$ and similarily a decision block 84 is driven by the outputs from the counter 70 and a bi-stable multivibrator 80 to generate stroke data $S_5$ and/or $S_7$. The decision blocks 82 and 84 are utilized for the strokes, vertical only, and are not to be confused with numeral decision of FIG. 8.

Each counter 68 and 70 and 76 is implemented by a toggled multivibrator, that is, a circuit element which exhibits two stable states which interchange every time one trigger pulse enters the block. This is permissable instead of employing a true counter, since each numeral always induces either one or two counts, but never zero or more than two counts. Initially the toggled multivibrator is set by the prior numeral decision to a logical 1. If there is one count, the device read logical 0 at decision time and if two counts, the unit reverts back to a logical 1 prior to decision time. Some noise immunity can be achieved by replacing counters 68, 70 and 76 with two stage shift registers. When these registers are full, they ignore additional pulses. Thus, if a double count is indicated in the numeral being read, an additional noise pulse cannot change the count. However, a single count in the register can erroneously change to a double count with a noise pulse. The counters 68, 70 and 76 and the bi-stable multivibrators 78 and 80 are cleared by erasure of this preceding stroke memory by numeral decision of FIG. 8 as were the bi-stable multivibrators 48, 52, 50 and 54 of FIG. 6.

Granularity in a vertical stroke can induce a counter to record a single stroke as more than one stroke. This undesirable effect can be minimized by three techniques. One method is to limit the frequency band of the photocell amplifier and/or to defocus the numeral image projected on the photocell array. A better approach is to trigger a monostable multivibrator with the vertical stroke signal and to set the period of the multivibrator longer than any stroke width but not so long as to run into a numerals second stroke. Thus a clean unbroken output is obtained that completely eliminates noise in the stroke signal and one that cannot be misinterpreted by the counter. Interestingly enough, left and right edge detectors are insensitive to stroke granularity and represent the preferred detection approach for badly situated characters. Small dirt spots can cause the erroneous triggering of the above mentioned monostable multivibrator but these effects are further limited by examining raw stroke data a second time at a fixed time delay after such data occurs. If the data is still present at the second observation, then it is accepted as being legitimate, otherwise it is rejected as being extraneous.

Figure 8:
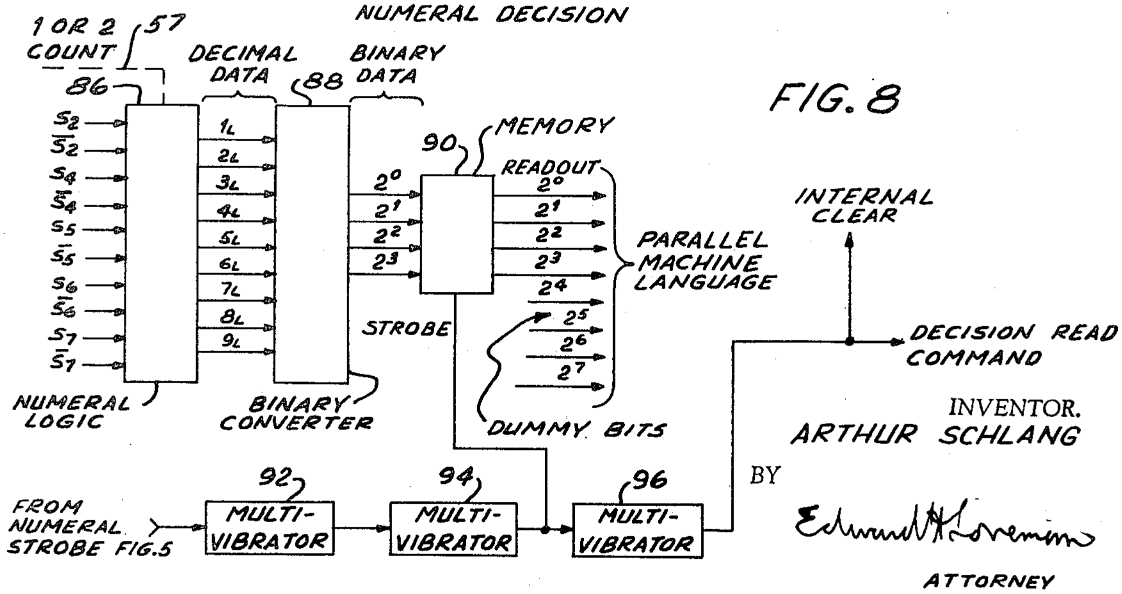
FIG. 8 is a diagram of logic circuitry employed to convert stroke data obtained from the circuits of FIGS. 5 and 6 or 7 to data bits representative of numerals.

In FIG 8, numeral logic 86 generates numeral decimal data from the stroke data. To evolve a numeral identity from stroke information, a separate AND gate within the numeral logic 86 is utilized for each numeral. Such a device accommodates a fixed number of inputs which must be at a logical 1 before the gate generates an output. If all but one input is logical 1, no output is generated. From the table of FIG. 4A, the numeral 8 requires a four-input gate to accept data from strokes $S_2$, $S_4$, $S_5$ and $S_6$. No input is required from stroke $S_7$ as this represents superfluous data. Numeral 3 requires a three-input gate to accept data on stroke $S_2$ and "not" stroke data on $S_4$ and $S_5$. That is, logical 1 is developed on strokes $S_4$ and $S_5$, if no strokes exist in positions $S_4$ and $S_5$. Lastly, numeral 9 requires a three-input gate, that examines data on strokes $S_4$ and $S_6$ and "not" data on stroke $S_5$. An additional input to 9 may be added to accommodate numeral 4 in that a single count must exist at photocell P1 for the three line data of 9 to be accepted as valid information. The numeral 4 requires no decoding since a double count at photocell P1 can only represent a numeral 4. There are nine outputs from numeral logic 86 of FIG. 8 where no decoding of the numeral 0 is required.

This so called decimal information is converted in a binary convertor 88 to binary data in conformance with the table of FIG. 8A which is the first step in evolving a machine language representation. To implement this converstion, four "or" gates are employed. These devices have a fixed number of inputs, but a logical 1 on any combination of inputs produces a gate output. The gate for the $2^0$ line has five inputs capable of excitation by numerals 1, 3, 5, 7 and 9 but not 2, 4, 6, 8, and 0 which directly follows the dictates of FIG. 9. The $2^1$ line utilizes a four-input gate. Numeral 0 develops all zeroes on the binary convertor output. When a numeral 0 is detected, the nine lines to the binary convertor 88 are zero and the "or" gates in turn produce no outputs.

The four data lines from the binary converter 88 of FIG. 8 are in a constant state of flux as a numeral is being scanned. It is intended only to examine these lines once numeral scanning is complete and this is termed "decision time." A memory 90 contains four latching circuits which retain the last data entered at the termination of the narrow strobe input signal. This strobe is generated in this manner: The trailing edge of the numeral strobe shown in FIG. 5, which denotes character termination time, triggers a monostable multivibrator 92 which in turn generates a fixed width pulse introducing a time delay. This insures that a numeral decision is deferred until after a character has passed and not during termination when stroke information is still being accumulated. A second monostable multivibrator 94 generates a narrow pulse and is triggered on the trailing edge of the monostable multivibrator 92 waveform. Thus, when the monostable multivibrator 94 fires, data is quiescent and ready for decision making. A monostable multivibrator 96 fires on the trailing edge of the monostable multivibrator 94 strobe or at a time when the numeral has been committed to memory in memory 90 and so instructs any subsequent systems blocks, as a magnetic tape recorder, to examine the four line memory for valid information. This waveform of monostable multivibrator 96 also clears all of the memory elements which are in the bistable multivibrators 48, 50, 52, 54, and 38 of FIG. 6 and the bi-stable multivibrators 36, 78 and 80 of FIG. 7 which thereby renders the electro-optical character reader receptive to the next numeral. The memory 90 of FIG. 8, however, retains numeral information which may be continually examined even during scanning of the following numeral. Only upon firing of the monostable multivibrator 94 is this information updated. For most commercial codes, the addition of dummy bits to the numeral binary representation completes the converstion to machine language. The added bits are placed on permanently connected wires and are shown in FIG. 8, and are labeled as bits $2^4$, $2^5$, $2^6$ and $2^7$. This represents an eight-bit format although other bit formats are easily realized by utilizing more or less dummy bits. FIG. 8A summarizes in tubular form the binary states of the output lines of convertor 88 for each numeral read.

The circuit described above permits the electro-optical character reader to operate at very low error rates for machine printing and carefully handlettered numerals, but in general it is inadequate to accomodate normal handwritten numerals which significantly vary in size, form and position about some norm. Additionally, horizontal stroke $S_2$ for handwritten characters only approximately bisects the character. The following description of FIGS. 9 – 19 details how stroke information is obtained from handlettered numerals which data is then further processed by the circuit of FIG. 8 as if it were derived from the circuits of FIGS. 5, 6 and 7.

The sensor employed to read handwritten characters consists of a linear array of photocells closely packed together. The numbers of photocells incorporated in the array will be a function of the variations in size, form and position for typical handlettering. In a manner similar to that shown in FIG. 3B, the document to be read is moved at an essentially constant speed before the sensor reading handwritten characters. Suitable logic is added to the multiple outputs of the linear array so that in effect three photocell outputs are judiciously selected which are analogous to photocells P4-6, P2 and P5-7 in FIG. 3B. We have in essence now created a sensor like that of FIG. 3B where cells P4-6, P2 and P5-7 are free to move vertically to adjust themselves to the numeral being read. The outputs of the selected photocells are then processed in a circuit identical to that of FIG. 8.

Figure 9:
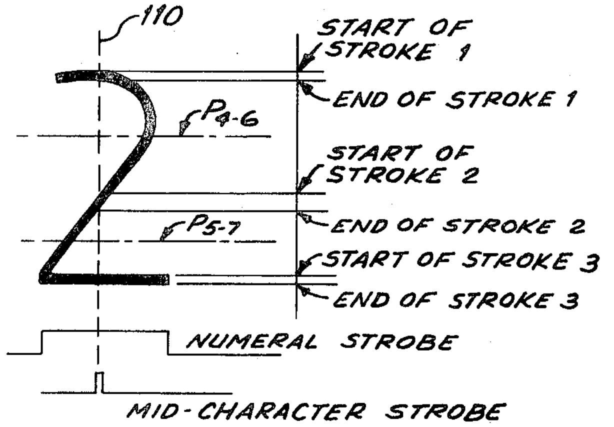
FIG. 9 and FIG. 11 are graphic diagrams of handwritten numerals used in explaining the invention.

In considering handwritten numerals FIG. 9 shows a typical handwritten numeral 2 wherein the lower part of numeral 2 leads the symbol and thus initiates the numeral stroke but the upper part of numeral 2 could just as well have led the lower part. The numeral strobe is derived by adding together all of the photocell outputs in the linear array just as the outputs of photocells P1 and P2 were combined in the adder 30 of FIG. 5. The numeral strobe in FIG. 9 terminates with the extended bottom numeral segment but the upper right hook just as well could have dictated this termination.

The mid-character strobe is a fixed time delay pulse referenced to the leading edge of the numeral strobe. In FIG. 9, the leading edge of the mid-character strobe is vertically extended with a continuous dotted line 110 which intersects numeral 2 at three different points. One or more photocells may be encompassed by the thickness of the numeral that the dotted line passes through. The horizontal projections of each intersection of the dotted line and the numeral are termed respectively stroke 1, 2 and 3. The start and end of each stroke are appropriately labeled and the midpoints of each stroke in effect define the position of the photocells P1, P2 and P3 in FIG. 3B.

The dash-dot line labeled P4-6 in FIG. 9 is positioned midway between the end of stroke 1 and the start of stroke 2 and defined the effective position of photocell P4-6 in FIG. 3B. Similarly, the effective position of photocell P5-7 is defined as midway between the end of stroke 2 and the start of stroke 3 in FIG. 9. Strokes 1, 2, and 3 in effect bound the handwritten numeral so that a new sensor configuration is assembled for each numeral as it is being read.

Figure 10:
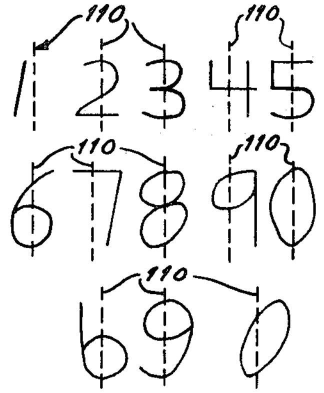
FIG. 10 is a diagram of a plurality of handwritten numerals.

FIG. 10 portrays a typical handlettered array of all 10 numerics where numerals 6, 9 and 0 are shown in two different forms. The vertical dotted line 110 is shown to horizontally divide each numeral in FIG. 10. The numeral 1 produces no intersections with the dotted line 110 so that numeral 1 is uniquely defined without further processing. Some numerals only have two intersections with the dotted line 110 as numeral 0 while numerals 6 and 9 may have two or three intersections depending on how they are drawn; see for example, FIGS. 10 and 11. Numerals 4 and 7 only exhibit one intersection. The method for handling the two intersection case is shown in FIG. 11 for a handwritten numeral 9.

Figures 11, 12:
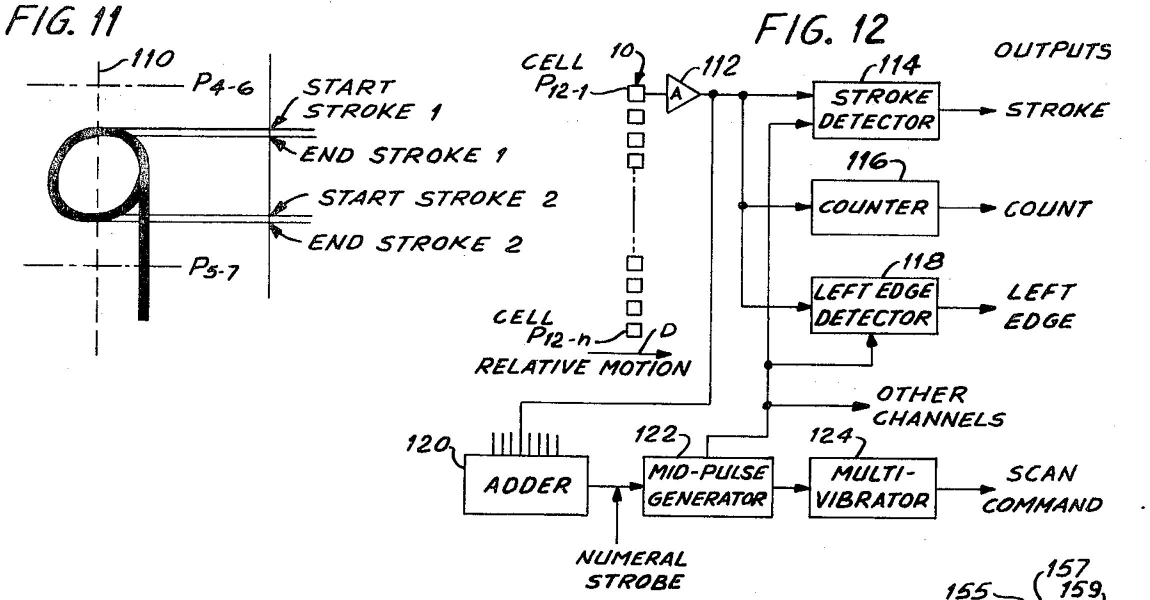
FIG. 12 is a block diagram of an array of photocells with a circuit for processing the outputs of the photocells.

In FIG. 11, the dotted line corresponding to the mid-character strobe generates stroke 1 and 2 data with no stroke 3 data. One half of the difference between the end of stroke 1 and the start of stroke 2 is added to the end of stroke 2 to evolve the position of P5-7 which intersection the lower vertical portion of numeral 9. If this were a numeral 6 with only two intersections, line P5-7 would completely lie below that numeral.

Referring again to FIG. 11, one-half of the distance between the end of stroke 1 and the start of stroke 2 is subtracted from the start of stroke 1 to evolve position P4-6 which misses numeral 9. If this were numeral 6 with two intersections, position P4-6 would intersect the upper vertical stroke of that numeral. Lastly, using the previous arithmetic criteria, position P4-6 would lie above numeral 0 while position P5-7 would lie below numeral 0. Thus the ambiguity between all dual-stroked characters is resolved.

Now consider the two numerals 4 and 7, each of which has one stroke, numeral 4 has a double count and 7 has none so that these two numerals are identified. Implementation of these outlined techniques is now given with particular reference to FIGS. 12–19.

The circuit shown in FIG. 12 has a sensor 10 for scanning handwritten characters. The characters are assumed to move horizontally in direction D. The sensor 10 comprises a large number of photocells P12-1 to P12-n arranged in a linear vertical array. The number of cells required is in reality a measure of image resolution. If a character is written small, there must be a sufficient number of cells analyzing the character to effect its interpretation. In FIG. 12 only the processing of the output of photocell P12-1 is shown with the outputs of the remaining cells processed identically. The output of cell P12-1 is amplified in an amplifier 112, which in turn drives a stroke detector 114 which develops an output if a long horizontal stroke is detected. A counter 116 generates either one or two counts depending upon the numeral and the part of the numeral that cell is examining. A left edge detector 118 generates an output if a left edge is detected.

Figures 13, 14:
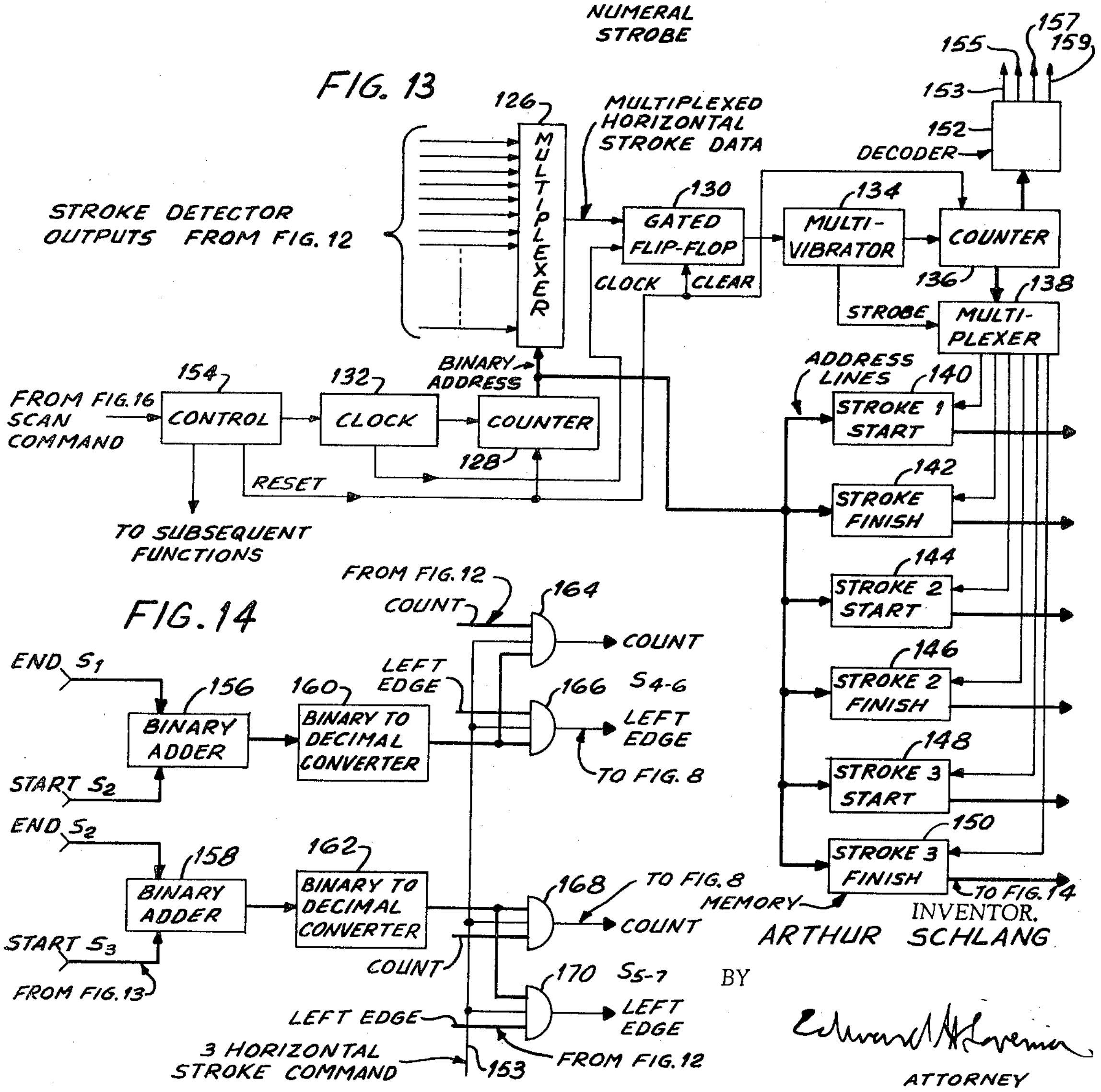
FIG. 13 is a block diagram of a circuit used to process data from the horizontal stroke detectors of FIG. 12.
FIG. 14 is a block diagram of a circuit used to process stroke, count and left edge data received from the circuits of FIGS. 12 and 13.

The stroke detector 114 is identical in operation to the detector comprised of the AND gate 34 and the bistable multivibrator 36 in FIG. 5. The counter 116 in FIG. 12 is identical in operation to the counters 68 and 70 in FIG. 7. The left edge detector 118 in FIG. 12 is identical in operation to the AND gate 40 and the bistable multivibrator 48 in FIG. 6. The outputs of all of the photocell amplifiers 112 are combined in an adder 120 to form a numeral strobe such as was formed in adder 30 in FIG. 5. A mid-pulse generator 122 performs identically to the pair of monostable multivibrators 31 and 32 of FIG. 5, but now controls "*n*" stroke detectors and left edge detectors instead of one as was illustrated in FIG. 5. The termination of the pulse from the mid pulse generator 122 triggers a monostable multivibrator 124 in FIG. 12 to initiate the analysis of outputs of the three detectors for each photocell channel. The outputs of all stroke detectors are sequenctially scanned to ascertain the number of horizontal strokes. A number of adjacent stroke detectors may indicate stroke presence but these are counted as one stroke. If three horizontal strokes are discerned, then the numeral is either an 8, 5, 3 or 2, and perhaps 9 or 6 depending upon how they are drawn. If two horizontal strokes are discerned then the numeral is either a 0 or 9 or 6 depending upon how they are drawn. If one stroke is detected, then the numeral is either a 7 or a 4. If none, then the numeral is a 1. If four or more horizontal strokes are detected, then the numeral is declared unreadable. FIG. 13 shows how adjacent horizontal strokes are interpreted as one stroke and how the cells detecting the start and finish of each such composite stroke are identified for subsequent computation.

In FIG. 13, stroke data from all of the photocell channels of FIG. 12 enter a multiplexer 126 wired in a sequential arrangement. The multiplexer 126 may correspond to, for example, a single pole multiple throw switch that examines each of its inputs in sequence to produce one time multiplexed output. The multiplexer 126 is electronically addressed by a counter 128 which instructs the multiplexer 126 by suitable digital commands, as to which photocell channel to examine for data. The counter 128 generates its commands in parallel binary form of the type indicated in FIG. 8A but more numbers are required. These commands are generated iteratively in a monotonically increasing magnitude.

The multiplexed data from the multiplexer 126 drives a gated flip-flop 130 which is triggered by a clock pulse from a clock 132 which also indexes the counter 128. When the multiplexer 126 finds horizontal stroke data, the gated flip-flop 130 changes its output to a binary 1. If stroke data is still present on succeeding adjacent channels, then the gated flip-flop 130 remains in its binary 1 state. Eventually a channel will be found where no stroke data exists and the gated flip-flop 130 will return to its binary 0 state. Further scanning may or may not uncover further horizontal stroke data but if more is discovered, the preceding process repeats up to a maximum of three times for a numeral with three horizontal strokes. The gated flip-flop 130 then rises to a binary 1 state when a stroke is discovered and only returns to binary 0 state after the stroke ends regardless of how many photocells that stroke encompasses in a vertical direction. Each transition of the gated flip-flop 130 triggers a monostable multivibrator 134 to generate a narrow pulse indicating either the start or finish of a horizontal stroke.

The monostable multivibrator 134 triggers a counter 136 which addresses a multiplexer 138 in a binary form identical to that of the multiplexer 126. Initially, the counter 136 causes the multiplexer 138 to address a memory 140. It requires the firing of the monostable multivibrator 134, however, before the memory 140 accepts the binary data from the counter 136. Thus the first information received is defined as the start of stroke 1 and the photocell number or address that stroke was detected on is stored in binary form in the memory 140. The counter 136 indexes again and another memory 142 is addressed. The memory 142 accepts data when the monostable multivibrator 134 fires again indicative of the binary address of the photocell detecting the end of horizontal stroke 1. This process continues until all photocells are scanned. Depending upon the numbers of horizontal strokes, some of the memories 140 through 150 may never be filled. The counter 136 also drives a decoder 152 which develops four outputs indicating whether 0, 1, 2, or 3 horizontal strokes are detected. These four lines select subsequent logic to utilize data processed in FIG. 12 and FIG. 13.

A control 154 in FIG. 13 is initiated by the scan command signal from the monostable multivibrator 124 of FIG. 12 which, as may be recalled, is activated when a numeral has been completely scanned and data processing can commence. The control 154 of FIG. 13 generates a fixed frequency train of pulses which causes the counter 128 of FIG. 13 to index. After all the photocells are scanned, the control 154 generates a reset pulse returning the counter 128, the gated flip-flop 130 and the counter 136, to their zero states in preparation for the next numeral. The memories 140 through 150, however, retain their data and are only updated when the counter 128 scans once more.

The control 154 initiates the next phase in the decision process now that data is known about horizontal stroke position.

Assume that the counter 136 of FIG. 13 ascertains the presence of three horizontal strokes. Then the output 153 of the decoder 152 actuates AND gates 164, 166, 168 and 170 in FIG. 14. The circuit of FIG. 14 now resolves the ambiguity between numerals 8, 5, 3 and 2 and 6 and 9 if drawn in a certain way, in this manner; For three horizontal strokes, strokes 1, 2, and 3, in FIG. 9 now are immediately known as strokes $S_1$, $S_2$ and $S_3$ as previously defined by FIG. 3B. This statement can not be made for less than 3 horizontal strokes at this time.

In FIG. 14, the end position of stroke $S_1$ and the start position of stroke $S_2$ are added in a binary adder 15-6 whose output is the binary sum of its input data. This adder is not to be confused with the analog adders previously mentioned as the adder 30 of FIG. 5, but is a true arithmetic summing device. Ignoring the least significant bit from the binary adder 156 effectively divides the output by 2 and thus produces the digital address of a photocell in between the end of stroke $S_1$ and the start of stroke $S_2$. A binary to decimal converter 160 converts the binary representation to a decimal format on N wires. This is the reverse of the operation of the binary converter 88 in FIG. 8 where decimal information is converted to binary data. The photocell now selected can be given the designation P4-6 as shown in FIG. 3B. Similarly in FIG. 14, a binary adder 158 and a binary to decimal converter 162 effectively select photocell P5-7 in FIG. 3B. In FIG. 14 AND gates 164 and 166 respectively select the count and left edge data from effective cell P4-6 from the circuit of FIG. 12. Similarly AND gates 168 and 170 do the same for effective cell P5-7.

The AND gates 164, 166, 168 and 170 are actually composed of a number of gates, each equal in number to the quantity of photocell channels. With all stroke data now known. FIG. 8 finishes the processing on numerals 8, 5, 3 and 2 and perhaps 6 and 9. However, more than one algorithm is generally required for each numeral to accomodate for the variations with which that hand printed character can take.

For a three stroke numeral, stroke $S_2$ exists by definition and is so communicated to FIG. 8 without the necessity of further logical selection.

Figures 15, 16, 17, 18:
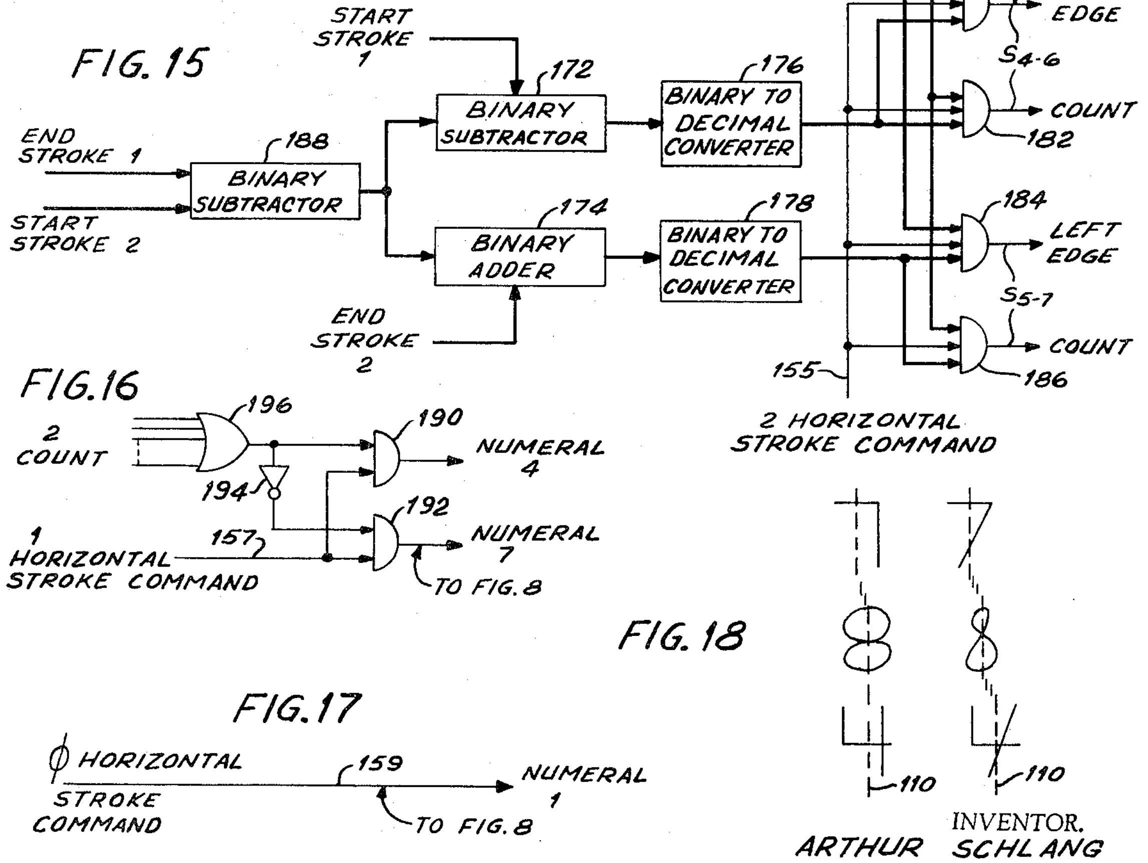
FIG. 15, 16, 17 are logic diagrams of circuits receiving stroke data from the circuit of FIG. 13.
FIG. 18 is a diagram of distorted handwritten numerals used in explaining the invention.

When decoder 152 of FIG. 13 determines that a numeral with two horizontal strokes has been scanned by means of the output 155, then gates 180, 182, 184 and 186 of FIG. 15 are activated. The gates 164, 166, 168 and 170 of FIG. 14 are blocked since they are only activated for a three horizontal stroke numeral.

In FIG. 15 a binary subtractor 188 computes the positional difference in binary form between the end of stroke 1 and the start of stroke 2 where the addresses of strokes 1 and 2 were evolved in FIG. 13. This is a purely digital arithmetic operation. The least significant bit from the output of the binary subtractor 188 is now discarded so that arithmetically the truncated output represents on half of the positional difference between strokes land 2. This data is now arithmetically subtracted in a binary subtractor 172 from the start of stroke 1 and the resultant information is converted to decimal data on N lines by binary to decimal converter 176. Similarly, the truncated output of the binary subtractor 188 is arithmetically added to the end address of stroke 2 in a binary adder 174 whose output is subsequently converted to decimal data on N lines by a binary to decimal converter 178.

The output of the binary to decimal converter 176 in effect selects the address of photocell P4-6 as defined in FIG. 3B while the output of the binary to decimal converter 178 selects the address of photocell P5-7.

The gates 180, 182, 184 and 186 in FIG. 15 consist of N gates each where only the selected gate within each gate group selects the appropriate numeral left edge and count as derived in FIG. 12.

A pair of gates 190 and 192 in FIG. 16 are activated when a single horizontal stroke 157 is detected by the decoder 152 of FIG. 13. All of the outputs from the counter 116 of FIG. 12 are combined in an OR gate 196 in FIG. 16, which gate develops an output when any single or multiple combinations of inputs generate a count of two. Such a count of two activates the gate 190 and deactivates a gate 192 since an inverter 194 inverts the logical output from a gate 196. The gate 190 then signals the presence of numeral 4 while the gate 192 signals the presence of numeral 7. This is contrary to the actions of the circuits of FIG. 14 and 15 where numeral segments were selected for further processing by the circuit of FIG. 8 in numeral logic 86. The outputs of the gates 190 and 192 of FIG. 16 now directly drive the binary converter 88 in FIG. 8.

In FIG. 17 the complete absence of horizontal strokes denotes numeral 1 which also directly drives the binary converter 88 in FIG. 8. This control was obtained from the decoder 152 in FIG. 13.

Although a numeral handwritten reader scheme for 10 symbols has been described, for a truly universal handwritten numeral reader to be effective it must read some numerals formed in more than one way. Typically, two each of numerals 4, 6, 7, 8 and 9 must be accommodated while one symbol usually sufficies for the remaining numerals 1, 2, 3, 5 and 0. In effect the electro-optical character reader reads fifteen not ten symbols. The ambiguous symbols are mutually exclusive and singular so that no confusion is incurred with other numerals or with their counterparts.

FIG. 10 illustrates two of the ambiguities for numerals 6 and 9 where either 2 or 3 horizontal strokes are incurred depending upon how the numeral is hand drawn. Two possibilities each of numerals 4, 7, and 8 are now drawn in FIG. 18. Here again numeral 7 has one or two strokes, numeral 8 has three or four strokes where the four stroke version is singular since no other numeral exhibits the four stroke characteristic. If four strokes are to be considered, then the prior criteria for rejecting a numeral as unreadable must be reexamined. The rejection criteria can be raised to five horizontal strokes or more. Lastly, numeral 4 has one or two strokes. Variations in numeral vertical height and position have been accommodated. Horizontal numeral position is unimportant as long as there is sufficient internumeral spacing. Allowances for variations in horizontal numeral width must now be considered to complete the description of this systems approach.

The basic strategy to be adopted in accommodating various width handwritten characters is to adjust the timing of the mid-character strobe as a function of the width of the character being read. This is analogous to the previous choosing of a group of photocells out of a large linear array to accommodate vertical character variations. Each character then arbitrarily selects the optimum configuration of photocells as a function of itself.

Figure 19:
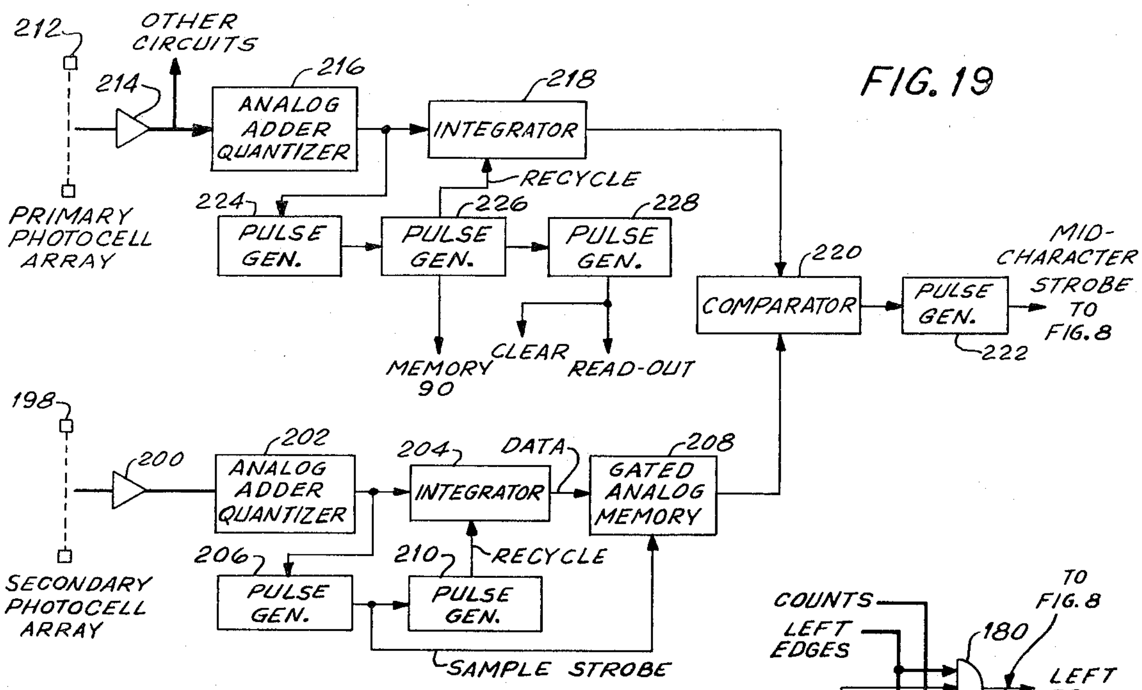
FIG. 19 is a diagram of an analog logic circuit employed to generate a timed mid-character strobe determined by the width of character being scanned.

To generate the mid-character strobe, a-priori knowledge of the character width is required before the symbol enters the photocell array. Such knowledge can not be obtained from the scanning linear array since that assemblage can only determine character width after the character has fully passed the array. It is then too late to utilize such data to control the timing of the mid-character strobe. To form the requisite width data, the primary array is preceded by a secondary array whose sole function is to detect the character and to ascertain its width prior to it entering the primary array. The character is fully scanned by the secondary array before any data is generated by the primary array so that mid-character strobe delay is established in sufficient time to be utilized in character determination. FIG. 19 illustrates how this technique is implemented utilizing two linear parallel arrays of sensors.

Data on a character is first detected by a secondary photocell array 198 with each cell individually amplified by one of a plurality of amplifiers 200. The multiple outputs from amplifier 200 are combined in an analog adder quantizer 202 whose output is a single fixed amplitude rectangular waveform having a time duration encompassing thefull extremity the full the character width. The rectangular waveform amplitude is constant, being independent of the signal levels emanating from the secondary photocell array 198 and is subsequently time integrated in an integrator 204. The output of the integrator 202 is a linear ramp function starting at zero signal level and continually increasing until the character is no longer discerned by the secondary photocell array 198. A pulse generator 206 is a monostable multivibrator which turns on which the output from the analog adder 202 reverts to zero level indicative of character termination.

The pulse generator 206 turns off shortly after turning on which causes a gated analog memory 208 to momentarily sample the output from integrator 204. The data level contained in integrator 204 is thereby stored in the analog memory 208. The termination of the output from the pulse generator 206 causes a pulse generator 210 to fire which then shuts itself off shortly after it is triggered. As a result of the firing of the pulse generator 210 the integrator 204 recycles itself to zero level but the gated analog memory 208 retains the last signal level contained in the integrator 204 prior to recycling which in analog form is a measure of character width.

The character subsequently translates before a primary photocell array 212 and each individual photocell contained therein is individually amplified in an amplifier 214. The multiple output of the amplifier 214 drive individual left and right edge detectors counters and stroke width detectors of the kind previously described above. These multiple outputs are also fused in an analog adder quantizer 216 to produce a single output in an identical manner to that of its counterpart quantizer 202. The output from the analog adder quantizer 216 is integrated by an integrator 218 whose time constant is approximately one half of that of integrator 204. This ramp function of the integrator 218 is compared in a comparator 220 against 208 stored character width D. C. signal in the memory 208 and thus the comparator 220 generates an output in the middle of the character by virtue of the two-to-one difference in time constants of the integrators 218 and 204. An identical result could have been realized by utilizing the same time constants for both integrators but scaling down the output of integrator 204 prior to comparison. The output of the comparator 220 triggers pulse generator 222 which then produces the requisite mid-character strobe. After the character has fully translated before the primary photocell array 212, the output from the analog adder quantizer 216 reverts to a zero level which cuases the triggering of a pulse generator 224. The generator 224 serves to delay read-out until the character is fully scanned and not during its termination when data is still being accumulated. The termination of the output from pulse generator 224 causes a pulse generator 226 to fire which recycles the integrator 218 to zero level and loads digital memory 90 of FIG. 8. The pulse generator 226 is then identical in function to the monostable multivibrator 32 of FIG. 5. The termination of the output from the pulse generator 226 triggers a pulse generator 228 which in turn instructs equipment external to the electro-optical character reader to accept data at that moment and also causes the various stroke and count memories contained within the electro-optical character reader to clear. It is significant to note that the integrator 204 may be accumulating data on the following numeral while integrator 218 is still assembling data on the present numeral. The gated analog memory 208 frees integrator 204 for this task. A signal match in comparator 220 is always effected prior to gated analog memory 208 being updated on the following numeral.

Figure 20:
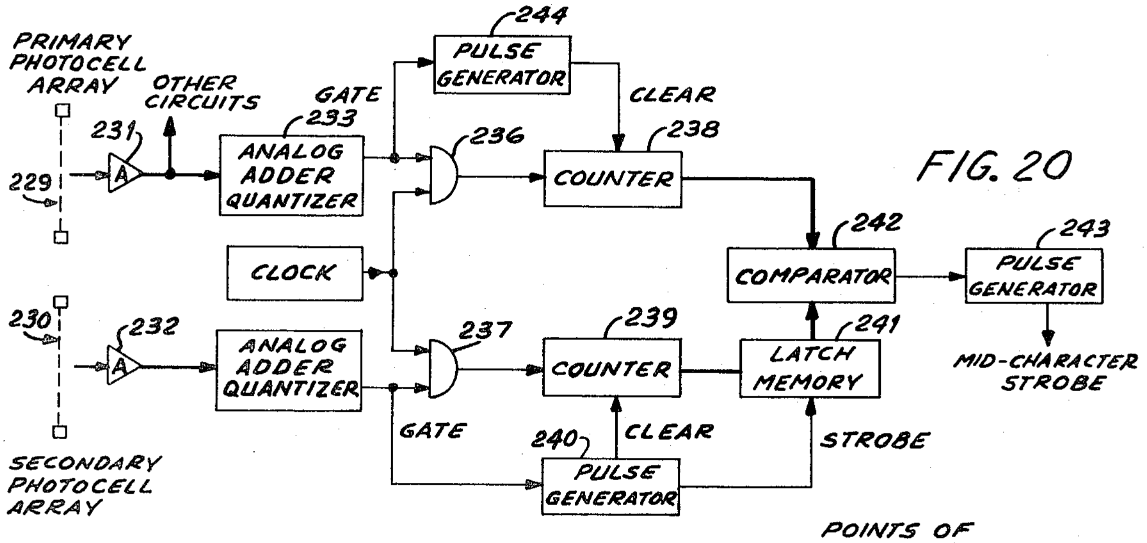
FIG. 20 is a diagram of a digital logic circuit employed to generate a mid-character strobe determined by the width of character being scanned, and which can be used in place of the circuit of FIG. 19.

FIG. 20 shows the digital equivalent of the analog processing circuit deriving the mid-character strobe data of FIG. 19. In FIG. 20, the input signals from a primary sensor cell array 229 and a secondary sensor cell array 230 are amplified in respective amplifiers 231 and 232 and applied to respective adder quantizer 233 and 234. The outputs from analog adder quantizers 233 and 234 are respectively equivalent to their counterparts 202 and 216 in FIG. 19 but from thereon the data is processed digitally.

The rectangular waveform emanating from the analog adder quantizer 234 activates a gate 237 which in turn passes a high frequency train of clock pulses generated by a clock 235. The pulses are counted and their number accumulated in a counter 239 which is a measure of character width. The falling edge of the output of the quantizer 234 causes a pulse generator 240 to momentarily strobe a latch memory 241 which assumes the same data as that contained in the counter 239 with the exception of the least significant bit. Thus the latch memory 241 stores a count equivalent to one half the character width. The pulse generator 240 next clears the counter 239 in preparation for the following character but latch memory 241 retains its data for use when the character enters the primary sensor array 229.

The analog adder quantizer 233 generates a rectangular waveform indicative of the character being detected by the array 229. This waveform activates a gate 236 which permits pulses from a clock 235 to trigger a counter 238 which pulses accumulate as the character is scanned by the array 229.

When the count contained in the counter 238 equals the count stored in the latch memory 241, a comparator 242 generates an output which activates a pulse generator 243 to form the requisite mid-character strobe. The counter 238 continues to accumulate data which accumulation ceases once the character has passed the array 229. A pulse generator 244 is then activated by the falling edge of the waveform from the quantizer 233 which returns the counter 238 back to a zero count in preparation for the next character.

Heretofore, two mid-character strobe generators, one analog and one digital, of FIGS. 19, 20 respectively, have been described which generate a mid-character strobe pulse precisely in the horizontal center of a character. For carefully lettered characters such a method is acceptable; but for general hand printing this technique occasionally fails to produce the desired results. What is hereafter described is a mid-character strobe generator which locates the strobe pulse at any point along a character which best bisects it into left and right components. This is analogous to choosing the optimum three or four photocells in a vertical array which are best able to define the character.

The technique for accomplishing this positional determination is as follows: First the character is scanned by a secondary array, and the photocell channels within that array, are rapidly multiplexed in sequence to examine the data for the number of horizontal strokes within the character. These numbers of strokes vary depending upon which part of the character the secondary array is crossing at any moment. The first scan stroke number is stored and if the following scan discloses a larger number of strokes than the preceeding scan, the memory is updated to reflect the higher number. This process continues until the character is fully scanned and the memory now contains the maximum number of strokes within the character which typically does not exceed a count of four. Under some conditions, it is advantageous to reject a count of four or higher and only memorize up to three counts. The character now enters a primary array where photocells scan in a like manner as those in the secondary array. Stroke count per scan is compared to the count stored from the secondary array. When the two counts are equal, the mid-character strobe is generated. A typical circuit implementation of this technique is illustrated in FIG. 21.

Figure 21:
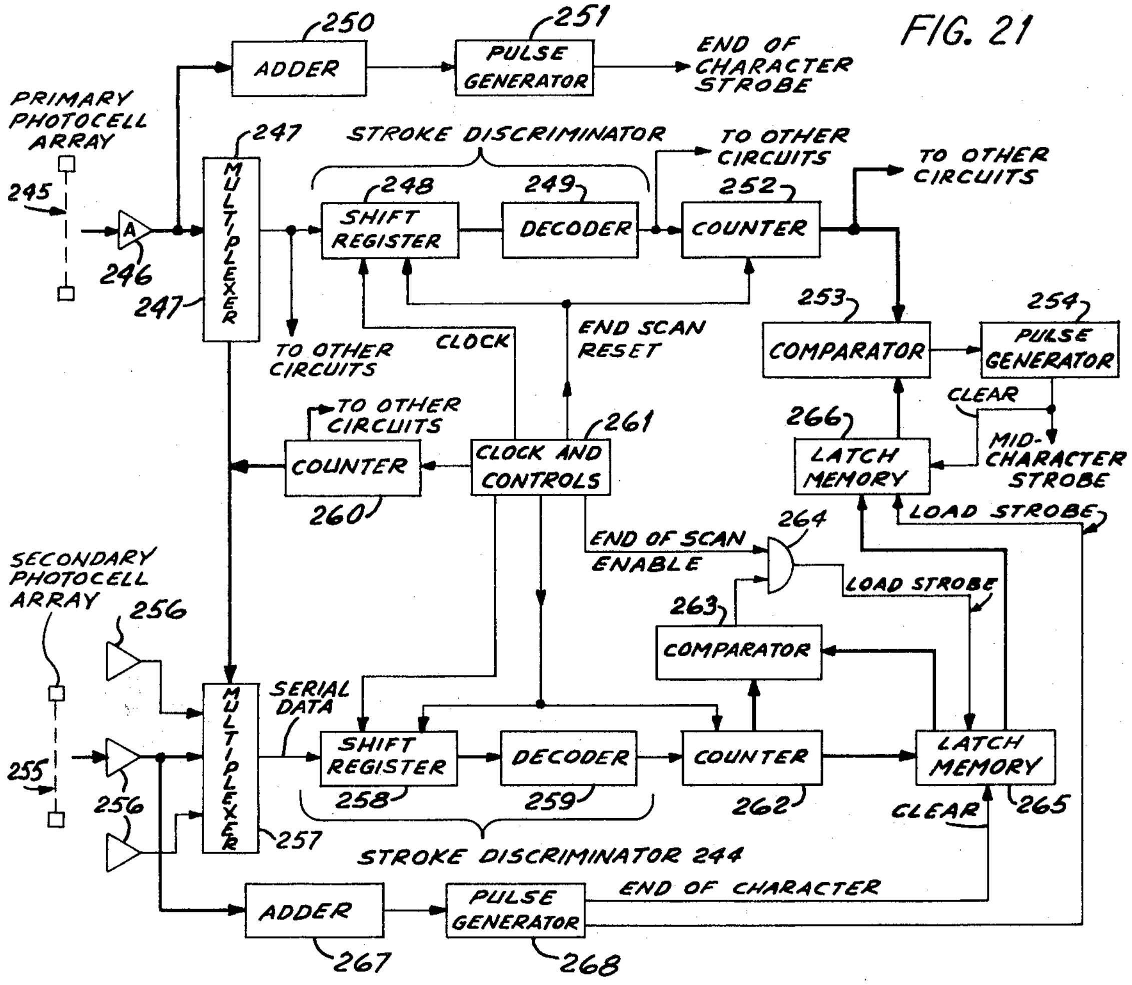
FIG. 21 is a diagram of a logic circuit for generating a mid-character strobe at any point along a distorted handwritten character which bests bisects the character in right and left components.

In FIG. 21 a secondary photocell array 255 is amplified by amplifiers 256 whose outputs are time-shared in a multiplexer 257. A counter 260 commands the multiplexers 257 and a multiplexer 247 to examine each photocell in the arrays 255 and an array 245 respectively in time sequence. The single line output from the multiplexer 257 drives a stroke discriminator circuit 244 consisting of a shift register 258 and a decoder 259. For full width characters, each of the multiplexers 247 and 257, scans that character typically, but not restricted to 64 times in passage.

Usually the shift register 258 stores data on five successive photocells which data is simultaneously examined by the decoder 259. As new data enters the register 258, the old data overflows that register. A criteria is established whereby a start of a stroke is only recognized providing the four preceding photocells observed no data. At this point, the decoder 259 generates an output indicative of a stroke start. The desired strokes are assumed to be sufficiently narrow so that it is not necessary to register their ends as was effected in FIG. 13. The rationale for the stroke discriminator 244 consisting of the register 258 and the decoder 259 instead of the simple gated flip-flop 130 of FIG. 13 is justified since the multiplexer 257 frequently scans through long vertical strokes whereas the flip-flop 130 of FIG. 13 theoretically does not have to cope with this situation. If the array 255 just grazes a long stroke then some photocells would indicate stroke presence and others would not depending on stroke, width variations within the photocell height and also variations in photocell channel sensitivity. The stroke discriminator 244 eliminates such uncertainties and designated the start of a long vertical stroke as one horizontal stroke. A counter 262 records the number of strokes detected within each scan period of the multiplexer 257. The count from the counter 262 is compared at the end of the scan period in a comparator 263 against data stored in a latch memory 265. If the data in the counter 262 exceeds that in the memory 265 then a gate 264 is energized at the end of the scan and the latch memory 265 is updated to contain information identical to that in the counter 262. After this comparison and updating are effected, shift register 258 and the counter 262 are cleared in preparation for the next scan but the latch memory 265 retains its data until the character has completely passed the secondary array 256. An adder 267, equivalent to the quantizer adder 216 of FIG. 19, generates a rectangular waveform equal in width to the time it takes the character to pass the array 255. The Adder 267 triggers a pulse generator 268 which generates a pulse shortly after the character has departed the array 255. This pulse causes a latch memory 266 to assume the date contained in the latch memory 265. After the memory 266 is loaded, the pulse generator 268 develops a second pulse which erases the memory 265. The previously described group of circuit blocks is now in a position to derive data on the next following character.

The character now enters a primary photocell array 245 and a counter 252 indicates strokes per scan as did the counter 262. A multiplexer 247 is similar and equivalent in focus and function as the multiplexer 257 as is a shift register 248 and the shift register 258, a decoder 249 and the decoder 259, and a counter 252 and the counter 262. When the count in the counter 252 equals that contained in the memory 266, a comparator 253 generates an output which triggers a pulse generator 254 to generate the requisite mid-character strobe. This strobe also clears the memory 266 so that subsequent scans of the counter 252 can not generate extraneous mid-character pulses. The pulse width from the generator 254 is one or more integral scan period in duration.

An adder 250 and a pulse generator 251 develop the end of character strobe for the primary array 245 as the adder 267 and the pulse generator 268 did for the secondary array 255. The primary array end of character strobe, signals that all data on a character is collected so that processing can commence to ascertain the characters identity.

FIG. 21 illustrates a data multiplexing technique for extracting the optimum position for the mid-character pulse. The following technique, exemplified by the circuit of FIG. 22, makes double use of the multiplexing regimen thereby eliminating the separate counter 116, the left edge detector 118 and the stroke detector 114 required for each photo-cell channel of FIG. 12. All of the inputs of FIG. 22 are derived from the outputs of FIG. 21.

Figure 22:
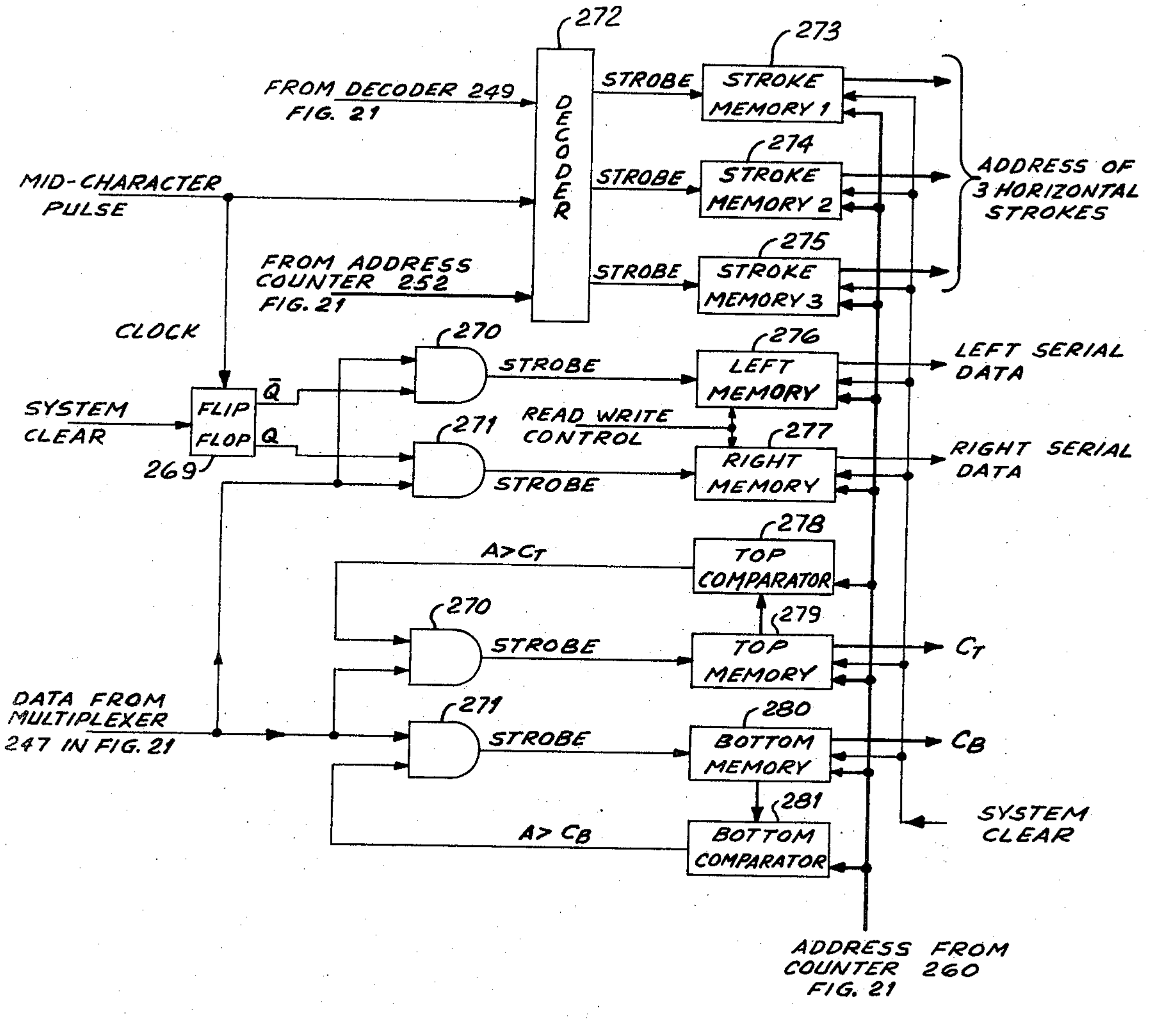
FIG. 22 is a diagram of a logic circuit used in conjunction with the circuit of FIG. 21 to generate stroke, count and left edge data.

The output from the decoder 249 in FIG. 21 which generates a pulse during the interval of the mid-character strobe and strobes the counter 252 also strobes a decoder 272 in FIG. 22. This pulse thus states that a legitimate horizontal stroke has been discerned. The decoder 272 in FIG. 12 routes this pulse to one of three stroke memories 273, 274 or 275 where the address of that pulse is committed to memory for later use. All of the stroke memories obtain their input address data from the counter 252 in FIG. 21.

The decoder 272 in FIG. 22 assigns the pulse from the decoder 249 in FIG. 21 to a memory depending upon the stroke number address it receives from the counter 252 in FIG. 21. In effect then the memory 273 in FIG. 22 stores the photocell address of the first pulse, the memory 274 the second and the memory 275 the third. The decoder 272 is only activated during the interval of the mid-character pulse which fully encompasses in width the number of stroke pulses received from the decoder 249 in FIG. 21.

The outputs of the memories 273, 274 and 275 are in parallel form and simultaneously denote addresses of up to three strokes. If three strokes are discerned, then all of the memories are active. If only two strokes are detected, then only the memories 273 and 274 contain useful data. Lastly one stroke is stored in the memory 273 with the remaining memories unused.

Whereas the memories 273, 274 and 275 store single words each, a pair of memories 276 and 277 a left and right respectively, store a binary 1 or 0 in an address slot denoting the presence or absence of photocell data at that address.

Consequently, it is only practical to read data out of memories 276 and 277 in a serial fashion.

The left memory 276 is intended to store data detected by all photocells which is received prior to and during the mid-character stroke interval. The right memory 277 is intended to store data detected by all photocells which is received subsequent to the mid-character strobe interval. In effect, horizontal count data from each photocell is destroyed by this approach, but as described below, substitute data is derived for replacing this loss.

When the primary array 245 in FIG. 21 first scans the character, a flip-flop 269 in FIG. 22 activates a gate 270 and deactivates a gate 271. Data from the multiplexer 247 in FIG. 21 then propagates through the gate 270 in FIG. 22 to strobe the left memory 276. Each strobe pulse is recorded in an address slot as determined by the address derived from the counter 260 in FIG. 21. As each photocell horizontally traverses a character, it may induce more than one strobe in transit since each full width character is scanned vertically a large number of times by the multiplexer 247 in FIG. 21. The numbers of strobes received to any one address slot for the memory 276 are merged and lose their separate identity. Data prior to and during the mid-character strobe interval is there or not regardless of the number of pulses.

At the termination of the mid-character pulse, flip-flop 269 changes state so that the gate 271 is now activated while the gate 270 is deactivated. Data from the multiplexer 247 in FIG. 21 now propagates through the gate 271 in FIG. 22 to strobe the right memory 277. In a manner identical to the function of the memory 276, the memory 277 contains the absence or presence of data in address slots as selected by the counter 260 of FIG. 21. After a character's identity has been determined the flip-flop 269 is returned to its initial state of activating the gate 270 in preparation for the following character.

Figure 26:
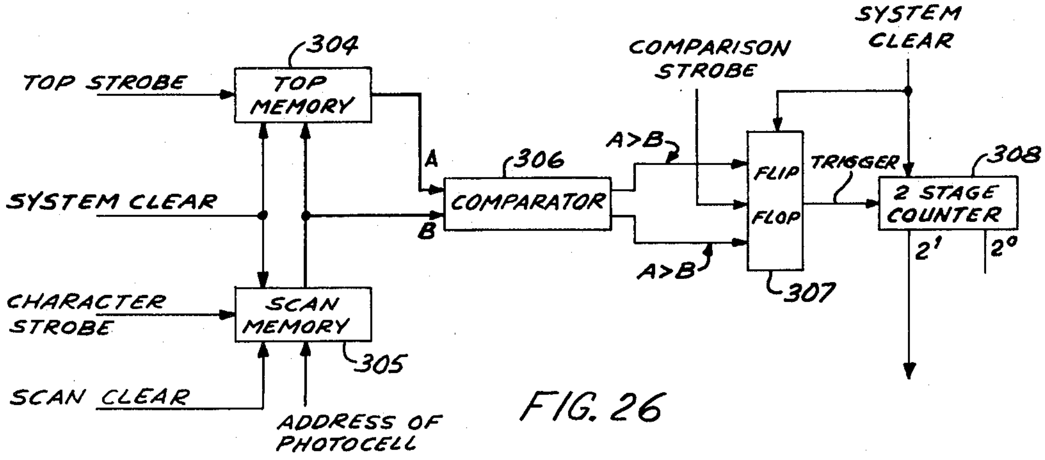
FIG. 26 is a diagram of a logic circuit used to generate data with respect to distorted characters such as shown in FIGS. 25A – 25G, based on points of inflection of the characters.

During the interval when the primary array 245 in FIG. 21 is scanning the character, the memories 276 and 277 in FIG. 22 are instructed to write data emanating from the gates 270 and 271. After the character has passed the array 245 in FIG. 21, the write command is cancelled and the read command is instituted so that each slot in the memories 276 and 277 in FIG. 26 is addressed, and examined for the absence or presence of data. In effect, an exact replica of data from the array 245 in FIG. 21 is stored until required for computation but such data is divided into left and right components.

A pair of memories 279 and 280 in FIG. 22 are utilized to store data on the upper and lower extremities of a character. The memory 279 stores the address of the top most photocell detecting the character while the memory 280 stores the address of the bottomost photocell discerning the character. The character is now vertically bounded. Prior to the character being scanned, the memory 279 contains a zero address or a word knwon to be less than the character top denoted as $C_t$. Similarly, the memory 280 is full or contains a word known to be greater than the character bottom denoted as $C_b$. The memories 279 and 280 differ from all prior memories in FIG. 22 in that they will contain one word each but equal to the address generated by the counter 260 in FIG. 21, at the time of the last strobe pulse to the memories 279 and 280. Whereas the memories 273, 274 and 275 receive only one strobe per character the memories 279 and 280 receive many.

The top memory 279 output is compared against the address from the counter 260 in FIG. 21 in a top comparator 278 in FIG. 22. If the address is greater than the data stored in the memory 279 then the comparator 278 activates a gate 283. Thus the memory 279 is only permitted to increase in magnitude but never decrease. Conversely, the bottom memory 280 is compared against the address in a bottom comparator 281. If the magnitude of the data stored in the memory 280 is greater than the address, then the comparator 281 activates a gate 282. Thus the bottom memory 280 is only permitted to decrease but never increase.

The first pulse from any scan of the multiplexer 247 in FIG. 21 represents the topmost photocell in that scan while subsequent pulses are from lower order cells. Thus the first pulse causes the memory 279 in FIG. 22 to assume the new address data of that initial pulse and to ignore data on subsequent lower order pulses as they arrive. The memory 280 also stores the address of the initial pulse in a scan but continually steps down as lower order pulses arrive. Thus the memory 280 contains the address of the last pulse on the first scan of multiplexer 247 in FIG. 21.

On the second scan the memory 279 increases providing the first pulse in the scan has an accompanying address greater than that stored in the memory 279. The memory 280 decreases providing the lower order pulses have lower addresses than that stored in the memory 280. This process continues until the whole character has moved before the array 245 in FIG. 21. Once a character decision has been made the memories 279 and 280 are returned to the quiescent states prior to arrival of the following character.

Figure 23:
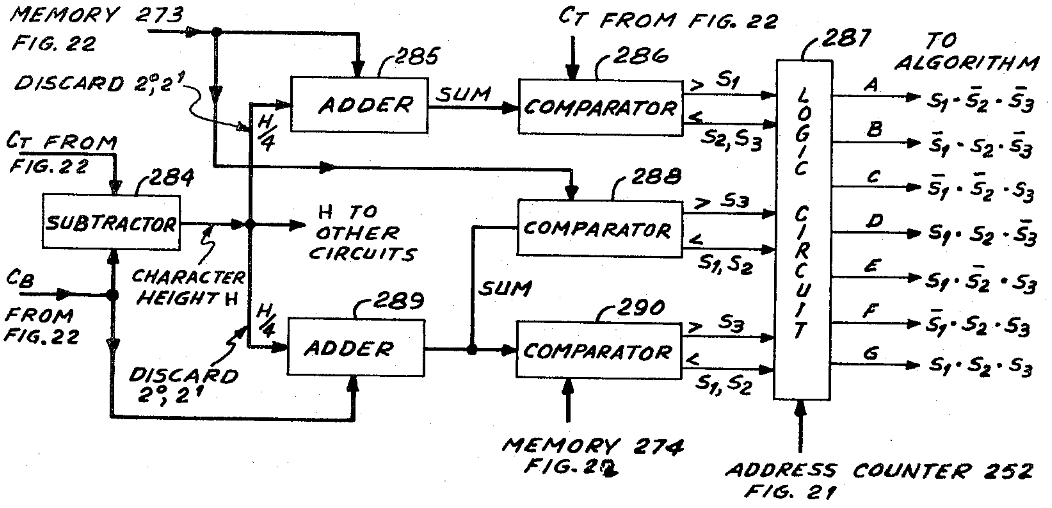
FIG. 23 is a diagram of a logic circuit used in conjunction with that of FIG. 22 to generate data indicative of the height of the scanned character.

If the memories 273, 274, and 275 in FIG. 22 all contain address data then the memory 273 is indicative of stroke $S_1$ as defined in FIG. 3B, the memory 274 is representative of stroke $S_2$ while the memory 275 denotes stroke $S_3$. If the memories 273 and 274 contain data but the memory 275 does not, i.e., a two stroke character, then the memory 273 denotes the address of either stroke $S_1$ or $S_2$ as defined in FIG. 3B and the memory 274 contains the data on stroke $S_2$ or $S_3$. For a one stroke character, only the memory 273 contains data which may be the address of strokes $S_1$, $S_2$, or $S_3$. FIG. 23 represents the technique for interpreting the significance of the data stored in the memories 273, 274 and 275 of FIG. 22.

As hereinbefore described the character top $C_t$ was derived from the top memory 279 while the character bottom $C_b$ was derived from the bottom memory 280. The character top $C_t$ and character bottom $C_b$ are now subtracted in a subtractor 284 to generate a digital word indicative of character height H. Discarding the two least significant bits from the output of the subtractor 284 in FIG. 23 yields a word signifying one fourth of character height H/4. Height H/4 is added in an adder 285 to the output of the memory 273 in FIG. 22 and the resultant sum is compared in FIG. 23 against the character top $C_t$ (derived from the top memory 279 in FIG. 22) in a comparator 286 in FIG. 23. If the sum is greater than $C_t$, by definition the address stored in the memory 273 in FIG. 22 is that of stroke $S_1$ as defined in FIG. 3B. If the sum is less than $C_t$, by definition the address represents either stroke $S_2$ or $S_3$. For a three stroke numeral the memory 273 in FIG. 22 always stores strikes $S_1$.

Height H/4 is also added in an adder 289 to the character bottom $C_b$ as derived in the bottom memory 280 of FIG. 22. The resultant sum from the adder 289 is compared in a comparator 290 against the memory 274 in FIG. 22. If the sum is greater than the memory 274 in FIG. 22 then by definition the data contained in the memory 274 of FIG. 22 is that of stroke $S_3$ as defined in FIG. 3B. Conversely, if the sum is less than the memory 274, the stroke is either $S_1$ or $S_2$. For a three stroke numeral the stroke is always $S_2$. Both the comparators 286 and 290 are required to resolve the disposition of strokes $S_1$, $S_2$ or $S_1$, $S_3$ or $S_2$, $S_3$ for a two stroke character. If the comparator 286 indicates strokes $S_2$ or $S_3$ and the comparator 290 indicates strokes $S_1$ or $S_2$ for a two stroke character, then by definition this represents a badly distorted character which is declared unreadable.

The comparator 286 in FIG. 23 is adequate to state that for one stroke character the address stored in the memory 273 in FIG. 22 represents stroke $S_1$ as defined in FIG. 3B but cannot resolve its designation as either stroke $S_2$ or $S_3$. To effect this resolution, a comparator 288 in FIG. 23 is utilized.

The output of the adder 289 which represents the sum of one quarter the character height plus the character bottom address $C_b$ is compared in the comparator 288 against the data in the memory 273 in FIG. 22. If the sum output of the adder 289, FIG. 23 is greater than that of the memory 273 FIG. 22 then data in that memory represents stroke $S_3$ as defined in FIG. 3B. If the sum is less than that of the memory 273 FIG. 22 then the memory contains data on stroke $S_1$ or $S_2$. This ambiguity is resolved by the comparator 286 of FIG. 23.

All outputs from the comparators 286, 288 and 290 drive a logic circuit 287 which also receives as another input stroke number data as derived from the counter 252 of FIG. 21. Seven lines emanate from the logic circuit 287 in FIG. 23 denoting all of the seven combinations of strokes possible where only one line at a time may be energized. These lines drive seven groups of algorithms which now only require data on strokes $S_4$, $S_5$, $S_6$ and $S_7$ as defined in FIG. 3B. The seven lines also serve the dual function of selecting data on strokes $S_4$, $S_5$, $S_6$ and $S_7$. The logic circuit 287 in FIG. 23 is a straightforward array of logic elements that implement the previous verbal description of the logical selection of the stroke combinations.

Figure 24:
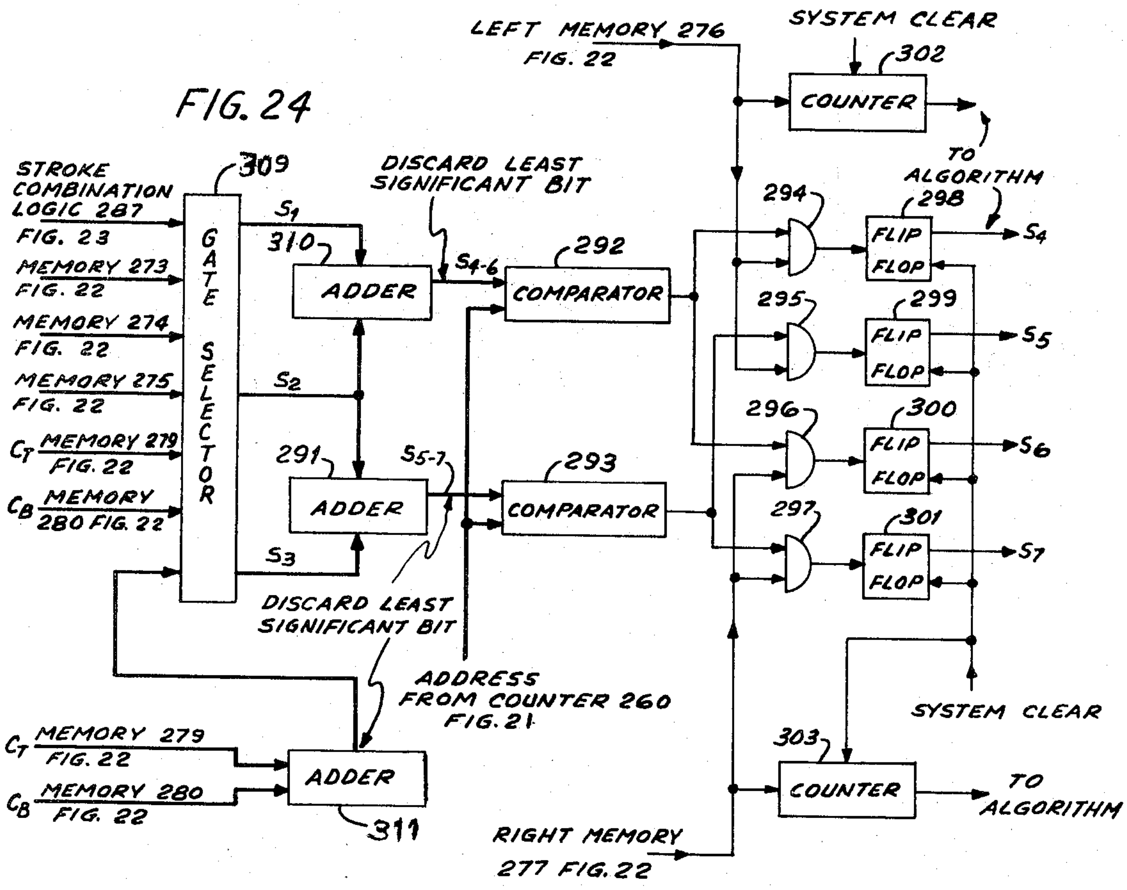
FIG. 24 is a diagram of a logic circuit used in conjunction with that of FIG. 22 to generate data representative of vertical strokes of a character matrix.

The circuit of FIG. 24 derives data on vertical strokes $S_4$, $S_5$, $S_6$ and $S_7$ as defined in FIG. 3B. This completes the necessary assemblage of stroke data to adequately define a reasonably well formed character plus data from a pair of counters 302 and 303 to resolve ambiguities incurred with poorly formed characters.

The horizontal stroke data relating to $S_1$, $S_2$ and $S_3$ is virtually immediately available for use when the character passes the primary photocell array 245 of FIG. 21. This is readily observed since all information pertinent to such stroke determination is accessable in parallel form from the memories 273, 274, 275, 279 and 280 in FIG. 22. Conversely, vertical stroke data relating to $S_4$, $S_5$, $S_6$, $S_7$ is stored in the memories 276 and 277 of FIG. 22 and can only be recovered by a scanning process after the character has departed the primary photocell array. FIG. 24 then illustrates how this post character scanning regimen is implemented.

A gate selector 309 in FIG. 24 utilizes stroke combination data from the logic 287 of FIG. 23 to select the address of stroke $S_1$, $S_2$, and $S_3$ from the data received from the following components of FIG. 22:

1 — Memory 273
2 — Memory 274
3 — Memory 275
4 — Memory 279
5 — Memory 280

In addition to these five inputs, a sixth is derived by an adder 311 of FIG. 24 which adds the memory 279 ($C_t$) of FIG. 22 to the memory 280 ($C_b$) of FIG. 22. By discarding the least significant bit from the sum output of the adder 311 FIG. 24, a word is derived representing the average between the inputs of that adder. We now have the address of a horizontal line directly in the middle of the character.

When the stroke combination from the logic circuit 287 of FIG. 23 develops an output on line $S_1$, $S_2$, $S_3$, the memory 273 in FIG. 22 is routed by the gate selector 309 to its output $S_1$. Similarly the memory 274 in FIG. 22 is routed to output $S_2$ of the gate selector 309 while the memory 275 in FIG. 22 is routed to the gate selector 309 output $S_3$. Three horizontal stroke addresses have now been sorted for a three-stroke character, and other input data to the gate selector 309 are not utilized for such a character.

An adder 310 takes the sum of outputs $S_1$ and $S_2$ from the gate selector 309. By discarding the least significant bit from the output of the adder 310, the address of strokes $S_4$ and $S_6$ as defined in FIG. 3B has been evolved. This address lies directly in the middle of the addresses of strokes $S_1$ and $S_2$ and is termed $S_{4-6}$. In a similar fashion, an adder 291 takes the sum of the addresses of strokes $S_2$ and $S_3$ emanating from gate selector 309 and by discarding the least significant bit from that sum, the address of strokes $S_5$ and $S_7$ as defined in FIG. 3B is evolved. This address termed $S_{5-7}$ lies directly in the middle of the addresses for strokes $S_2$ and $S_3$. Address output $S_{4\text{-}6}$ from the adder 310 is compared in a comparator 292 against the address from the counter 260 in FIG. 21. When these two inputs are equal, a comparator 292 generates an output which enables a gate 294 and a gate 296. Address $S_{5\text{-}7}$ from an adder 291 is similarly compared in a comparator 293 against the address from the counter 260 of FIG. 21. When these two inputs are equal, the comparator 293 generates an output which enables a gate 295 and a gate 297. This comparison process only commences after the character has passed the primary photocell array 245 of FIG. 21 and a search can now be made through the memories 276 and 277 of FIG. 22 to find the absence or presence of strokes $S_4$, $S_5$, $S_6$ and $S_7$ as defined in FIG. 3B. Data from the left memory 276 of FIG. 22 propagates through the gates 294 and 295 while data data from the right memory 277 of FIG. 22 propagates through the gates 296 and 297. Both the memories 276 and 277 are simultaneously scanned by the output of the counter 260 in FIG. 21 as are the comparators 292 and 293.

If the comparator 292 generates an output, indicative of the fact that a memory slot in the memory 276 of FIG. 22 is being examined by the presence of stroke $S_4$, and that slot contains a binary 1, such data propagates through the gate 294 to set a flip-flop 298 to a binary 1 output denoting the presence of stroke $S_4$. Four flip-flops 298, 299, 300 and 301 are required as scratch pad memory devices since the comparators 292 and 293 only develop their enabling outputs at one point in a scan cycle. If the comparator 292 generates an output and there is a binary 0 in the addressed memory slot in the memory 277 of FIG. 22 no data propagates through the gate 296 and the flip-flop 300 generates a binary 0 output denoting the absence of stroke $S_6$. Some time interval after the comparator 292 develops an output the comparator 293 generates its output. If a binary 1 is present in the memory 276 of FIG. 22 then this data propagates through the gate 295 to set the flip-flop 299 to a binary 1 indicative of the presence of stroke $S_5$. Lastly, if a binary 0 is stored in the memory 277 of FIG. 22 no data propagates through the gate 297 and the flip-flop 301 generates a binary 0 output indicating the absence of stroke $S_7$. Interchanging binary 1 for 0 or vice versa in the preceding explanation reverses the status of the flip-flops 298, 299, 300 and 301.

As the left memory 276 in FIG. 22 is being scanned and examined twice during that scan for the presence of strokes $S_4$ and $S_5$ as defined in FIG. 3B, such data also triggers a counter 302 in FIG. 24 which accumulates the number of data breaks from the left memory 276 of FIG. 22. This counter helps resolve the difficulties encountered for a poorly formed character. For example, a numeral 3 with an almost closed upper loop could be misinterpreted as a numeral 9. However, a numeral 9 would induce either one or two counts (depending upon formation) in the counter 302 while numeral 3 would induce a count of three, Significantly, a vertical count technique is employed here to aid the algorithm, while a horizontal count technique was postulated in FIG. 6. This is the substitute method employed to compensate for the fact that horizontal count data was destroyed in being read into the memories 277 and 278 in FIG. 22.

A counter 303 records the numbers of data breaks stored in the memory 277 of FIG. 22. This counter resolves such ambiguities as a numeral 6 with an exaggerated top loop decoding as a numeral 8. If a numeral 8 is indicated by the algorithm, then the right count must be unity otherwise, a count of two re-identifies the numeral as a 6. Once a character decision is made, System Clear pulses return the counters 302 and 303 and the flip-flops 298, 299, 300 and 301 to their quiescent status in preparation for the following character.

For a dual stroke character containing only strokes $S_2$ and $S_3$ but not $S_1$ the gate selector 309 selects character top $C_t$ from the memory 279 of FIG. 22 as output address $S_1$. The memory 273 (FIG. 22) is chosen by the gate selector 309 for address $S_2$ while the memory 274 (FIG. 22) is chosen for stroke $S_3$ address. The memory 275 (FIG. 22) contains no data for a two-stroke character.

For a dual stroke character containing only strokes $S_1$ and $S_2$ but not $S_3$ as defined in FIG. 3B, the gate selector 309 selects the memory 273 (FIG. 22) for stroke $S_1$, the memory 274 (FIG. 22) for strokes $S_2$ and character bottom $C_b$ from the memory, 280 (FIG. 22) for stroke $S_3$.

For a dual stroke character containing only strokes $S_1$ and $S_3$ but not $S_2$ the gate selector 309 selects the memory 273 (FIG. 22) for stroke $S_1$, the arithmetic average of the memories 279 and 280 (FIG. 22) from the adder 311 for stroke $S_2$, and the memory 274 (FIG. 22) for stroke $S_3$. For stroke $S_2$, it might have been more accurate to derive the mathematical average of the memories 273 and 274 of FIG. 22 rather than the memories 279 and 280. However since there are only a small number of characters incurring this stroke combination, no error in interpretation is realized in employing the earlier criteria.

For a single stroke character containing stroke $S_1$ but not strokes $S_2$ and $S_3$ the gate selector 309 choses the memory 273 (FIG. 22) as stroke $S_1$ the output of the adder 311 as stroke $S_2$ and the memory 280 (FIG. 22) as stroke $S_3$. For a single stroke character containing stroke $S_2$, but not strokes $S_1$ and $S_3$, the gate selector 309 selects the memory 279 (FIG. 22) as stroke $S_1$ the memory 273 (FIG. 22) as stroke $S_2$ and the memory 280 (FIG. 22) as stroke $S_3$.

For a single stroke character containing stroke $S_3$ but not strokes $S_1$ and $S_2$, the gate selector 309 selects memory 279 (FIG. 22) for stroke $S_1$, the adder 311 for stroke $S_2$ and the memory 273 (FIG. 22) for stroke $S_3$.

In spite of all of the previously explained techniques for revolving badly formed characters, some extremes in character distortion will cause a character to be misread. The technique now to be presented is useful in rectifying such troublesome situations. A badly composed numeral 4, for example can be interpreted by the earlier techniques as a numeral 7 or a numeral 9 depending upon the nature of the aberrations. FIG. 25*a* – 25G show three distorted forms of numeral 9, one of numeral 7 and two of numeral 4.

Normal scan direction is indicated by the arrow SD which for the sake of illustration is transverse to that assumed in earlier descriptions. Characters represent multiple valued functions; that is, a scan may intersect a character in more than one place. These characters are then reduced to single valued functions by only using the topmost intersection between the scan and the character for subsequent character analysis.

Figures 25A, 25B, 25C, 25D, 25E, 25F:
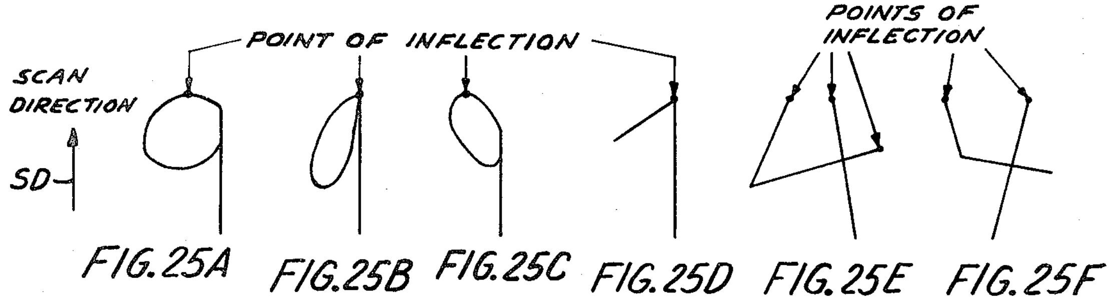
FIG. 25A – 25G are diagrams of badly formed or distorted handwritten characters used in explaining the invention.
Figure 25G:
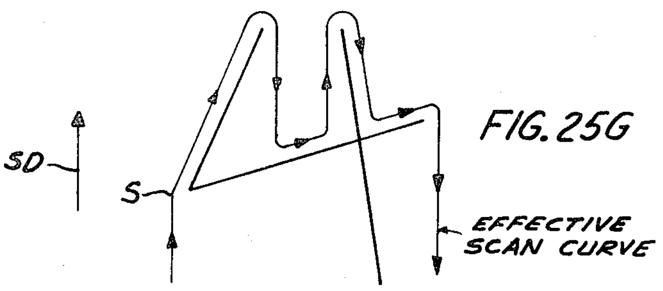

In FIG. 25A, the topmost curve of numeral 9 starts with a positive mathematical slope which goes to zero and then negative. Mathematically stated, there is one point of horizontal inflection in the middle of the character. It does not matter what the long vertical stroke of that numeral does if that stroke swings out to the right, it remains part of the negative slope trend, even through a point of discontinuity may be incurred where that strokes joins the main body of the numeral. If the stroke swings positive but under the top ellipse, it is eliminated by virtue of the selection of the upper part of the numeral. Numeral 9 in FIG. 25B has its single point of horizontal inflection near the right extremity of that character while numeral 9 in FIG. 25 C has this inflection near the left numeral extremity. Most numeral 9's then exhibit only one point of inflection.

By a similar analysis, most numeral 7's as in FIG. 25D also exhibit only one inflection point. FIG. 25E shows a numeral 4 with three points of inflection where an infinite negative slope is presumed starting at the first and third points of inflection. FIG. 25F demonstrates a numeral 4 with two points of inflection. In general, numeral 4 has either one or two inflection points (depending on its construction) while the previous competing numerals 7 and 9 have only one point. Using this criteria of examining troublesome characters, ambiguities can be eliminated. FIG. 25 G is an enlarged replica of FIG. 25E but the effective scan curve is traced for purposes of illustration. FIG. 26 demonstrates how the inflection point technique is implemented.

In FIG. 26, a pair of memories 304 and 305 initially store words of zero magnitude. A flip-flop 307 has a binary 0 output while a counter 308 stores a count of zero. The scan memory 305 is addressed by the photocell address which data is entered into memory 305 at the first crossing of the scan and the character which generates the character strobe. Each subsequent strobe in any one scan updates the scan memory 305 to reflect the photocell address at the time of the character strobe. At the top of the scan, the scan memory 305 contains a word representing the address of the photocell residing on the top portion of that character at that scan.

Lower order character-scan intersections are thus ignored. At the top of the scan, data in the top memory 304 is compared against data in the scan memory 305 in a comparator 306. The output of the top memory 304 is labelled A while the output of scan memory 305 is labelled B. On the first scan, B is greater than A since the memory 304 was initially set to zero. The comparison strobe is initiated at the top of the scan which causes the flip-flop 307 output to go to a binary 1. The counter 308 does not count since it only triggers on falling pulse edges.

After the comparison strobe interval, the top strobe is initiated which causes the top memory 304 to assume the same data contained in the scan memory 305. After this pulse the photocell address recycles back to the first photocell and the scan memory 305 clears through the Scan Clear line. Assume that at the end of the second scan that data in the scan memory 305 still exceeds that in the top memory 304 which is no longer zero. With the firing of the comparison strobe the flip-flop 307 does not change the state since its input data is unchanged. The counter 308 also retains its zero count state. Eventually at the top of the scan, the top memory 304 will exceed the scan memory 305 which causes the dual outputs of the comparator 306 to interchange. With the firing of the comparison strobe, the flip-flop 307 changes states and the counter 308 counts one point of inflection.

If the top memory 304 exceeds the scan memory 305 on subsequent scans the flip-flop 307 does not change its state and the counter 308 stays at a count of unity. If the scan memory 305 finally exceeds the top memory 304 at the end of a scan the flip-flop 307 changes state to a binary 1 but the counter 308 does not count. It requires the scan memory 305 to be less than the top memory 304 again before a second count is recorded in the counter 308.

The counter 308 is a two-stage device, and it is only necessary to examine the higher order bit for a count of two or three indicative of the detection of numeral 4. A count of one is ignored as signalling no ambiguities. System Clear is energized after a character decision is made and the elements 304, 305, 307 and 308 are returned to their quiescent states.

Although the techniques described above have been explained only in connection with handwritten numerals, it will be understood that they are applicable to alphabetical characters and other symbols based upon a rectangular matrix as shown in FIG. 3B. The characters to be scanned can be inscribed upon a card, tape or other medium moved at a nominally constant speed before the arrays of sensors.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

The invention claimed is:

1. A character reader for optically reading handwritten characters of a font of two dimensional plane characters based on an ideal rectangular plane matrix of two mutually perpendicular sets of linear strokes, comprising:

an array of scanning cells disposed to scan said characters one at a time while said characters are moved relative to said array in a direction of movement perpendicular to said array in the plane of said matrix and parallel to one of said sets of strokes;

first circuit means connected to said cells for generating a mid-character strobe pulse associated with the vertical center line of each character scanned by said array of cells;

a left storage means connected to said array of cells and responsive to said first circuit means for storing signals generated by said cells on the left of the vertical center line of said character;

a right storage means connected to said array of cells and responsive to said first circuit means for storing signals generated by said cells on the right of the vertical center line of said character;

a first pulse generating means connected in circuit with said first circuit means and said array of cells for generating pulses corresponding to the intersection of said character with the vertical center line;

a second circuit means connected to said right storage means and to said left storage means for determining the top and bottom edges of said character;

a third circuit means connected to said second circuit means and to said first pulse generation means for determining the vertical strokes in the upper half of said character and the vertical strokes in the lower half of said character; and logic circuit means connected to said second circuit means and said third circuit means for producing data bits indicative of said character.

2. A character reader as defined in claim 1 further comprising a numeral logic circuit connected to said logic circuit means for generating decimal data corresponding to the identified strokes of said matrix characteristic of each scanned character;

binary conversion means in circuit with said numeral logic circuit for converting said decimal data to binary data on a predetermined number of output lines;

memory means in circuit with said binary conversion means for storing said binary data while each character is being sannned;

circuit control means in circuit with said memory means for actuating said memory means to release the binary data corresponding to each of said characters when scanning of each of said characters is completed; and readout means in circuit with said memory for receiving therefrom data bits corresponding to each of said scanned characters.

3. A character reader as defined in claim 2, wherein said array of scanning cells is comprised of a primary array and a secondary array which is disposed in advance of said primary array of scanning cells to scan said characters one at a time;

a first analog circuit means connected to said secondary array of cells and arranged to generate a pulse corresponding to the width of character being scanned thereby;

a second analog circuit means connected in circuit with said primary array of cells; and a pulse generator means connected to both of said analog circuit means to generate a mid-character strobe pulse corresponding to the center of each character scanned by both of said arrays of cells said pulse generator means being connected to said circuit control means for actuating the same.

4. A character reader as defined in claim 1 wherein said array of scanning cells is comprised of a primary array and secondary array of scanning cells disposed in advance of said primary array of scanning cells to scan said characters one at a time; and a pulse generation means connected in circuit with said primary array and said secondary array to generate a mid-character strobe pulse corresponding to the center of each character scanned.

5. A character reader as defined in claim 1 further comprising a second pulse generation means connected in circuit with said logic circuit means to generate pulses indicative of the height of each character scanned.

6. A character reader as defined in claim 1 further comprising second pulse generation means connected in circuit with said logic circuit means to generate pulses for each character scanned corresponding to vertical strokes of said matrix.

7. A character reader as defined in claim 1 further comprising a second pulse generation means connected in circuit with said logic circuit means to generate pulses determined by points of inflection of each character scanned.

8. A character reader as defined in claim 1 further comprising a second pulse generation means connected in circuit with said logic circuit means to generate pulses according to the horizontal strokes of said matrix.

* * * * *